United States Patent
Kusayanagi et al.

(10) Patent No.: US 11,479,149 B2
(45) Date of Patent: Oct. 25, 2022

(54) OCCUPANT POSTURE CONTROL METHOD AND OCCUPANT POSTURE CONTROL DEVICE

(71) Applicant: Nissan Motor Co., Ltd., Yokohama (JP)

(72) Inventors: Yoshinori Kusayanagi, Kanagawa (JP); Tomohiro Yamamura, Kanagawa (JP); Mitsuhiro Makita, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/290,285

(22) PCT Filed: Nov. 6, 2018

(86) PCT No.: PCT/IB2018/001332
§ 371 (c)(1),
(2) Date: Apr. 30, 2021

(87) PCT Pub. No.: WO2020/095082
PCT Pub. Date: May 14, 2020

(65) Prior Publication Data
US 2022/0016998 A1   Jan. 20, 2022

(51) Int. Cl.
*B60N 2/02* (2006.01)
*B60N 2/90* (2018.01)

(52) U.S. Cl.
CPC .......... *B60N 2/0244* (2013.01); *B60N 2/976* (2018.02); *B60N 2002/0268* (2013.01); *B60N 2002/0272* (2013.01); *B60N 2002/981* (2018.02)

(58) Field of Classification Search
None
See application file for complete search history.

(56) References Cited

U.S. PATENT DOCUMENTS

| | | | | |
|---|---|---|---|---|
| 6,087,942 A | * | 7/2000 | Sleichter, III | G08B 21/06 340/576 |
| 11,351,892 B1 | * | 6/2022 | Roy | B60N 2/806 |
| 2002/0145512 A1 | * | 10/2002 | Sleichter, III | B60N 2/56 340/407.1 |
| 2013/0255696 A1 | * | 10/2013 | Fraser | A47D 13/04 128/845 |
| 2014/0228985 A1 | * | 8/2014 | Elliott | A61B 5/11 700/91 |
| 2014/0288471 A1 | * | 9/2014 | Gangwish | A61H 39/00 601/46 |
| 2018/0037236 A1 | * | 2/2018 | Yamaguchi | A61B 5/18 |

(Continued)

FOREIGN PATENT DOCUMENTS

| | | |
|---|---|---|
| CN | 1157235 A | 8/1997 |
| CN | 102309838 A | 1/2012 |

(Continued)

*Primary Examiner* — David E Allred
(74) *Attorney, Agent, or Firm* — Global IP Counselors, LLP

(57) ABSTRACT

An occupant posture control method is provided that can suppress motion sickness. The occupant posture control method predicts a vehicle motion based on information relating to the vehicle motion, and imparts a stimulus that generates a muscle tension such that the occupant assumes a posture corresponding to the vehicle motion, when a predicted vehicle motion occurs.

14 Claims, 15 Drawing Sheets

(56) References Cited

U.S. PATENT DOCUMENTS

| | | | | |
|---|---|---|---|---|
| 2019/0389269 A1* | 12/2019 | Frasher | .................. | B62D 24/00 |
| 2019/0389270 A1* | 12/2019 | Frasher | .................... | B60G 3/20 |
| 2019/0389342 A1* | 12/2019 | Frasher | .................... | B60N 2/39 |
| 2020/0307416 A1* | 10/2020 | Gandhi | .................... | B60N 2/68 |
| 2020/0315910 A1* | 10/2020 | Yamaguchi | .............. | A61H 1/00 |
| 2021/0114553 A1* | 4/2021 | Awtar | ...................... | B60N 2/39 |

FOREIGN PATENT DOCUMENTS

| | | |
|---|---|---|
| CN | 103732441 A | 4/2014 |
| DE | 10 2018 008 627 A1 | 4/2020 |
| JP | 8-216747 A | 8/1996 |
| JP | 2008-97058 A | 4/2008 |
| JP | 2010-128667 A | 6/2010 |
| JP | 2015-182564 A | 10/2015 |
| JP | 2017-71370 A | 4/2017 |

\* cited by examiner

OCCUPANT POSTURE CONTROL METHOD AND OCCUPANT POSTURE CONTROL DEVICE

CROSS-REFERENCE TO RELATED APPLICATIONS

This application is a U.S. national stage application of International Application No. PCT/IB2018/001332, filed on Nov. 6, 2018.

BACKGROUND

Technical Field

The present disclosure relates to an occupant posture control method and an occupant posture control device.

Background Information

A device for controlling the posture of an occupant of a vehicle is known from the prior art in which an active control seat is tilted to keep the occupant's posture flat (for example, see Japanese Laid-Open Patent Application No. 8-216747 herein after refer to as Patent Document 1). In this prior art, a motor for tilting the seat to the left and right is provided, the lateral acceleration that the vehicle is likely to receive is calculated, and the seat is tilted in the direction opposite to the lateral acceleration in accordance with the magnitude of the lateral acceleration and the generated speed.

SUMMARY

In the technology disclosed in Patent Document 1, when the seat is tilted such that the occupant's posture is stable, in accordance with the lateral acceleration of the vehicle, the required amount of tilt is large, and it takes time to tilt the seat to the angle corresponding to the lateral acceleration.

For this reason, tilting the seat to an optimal position following a change in the vehicle behavior that could induce motion sickness cannot be carried out in time, and, as a result, there is the risk that a passive change in posture occurs due to vehicle behavior and the occupant cannot be stabilized at an appropriate posture corresponding to the vehicle motion. Then, if the occupant cannot be placed in a posture corresponding to the vehicle motion, there is the risk that motion sickness will be induced.

In view of the problem described above, an object of the present disclosure is to provide an occupant posture control method and an occupant posture control device that can place the occupant in a posture corresponding to the vehicle motion to suppress motion sickness.

The occupant posture control method according to the present disclosure comprises predicting vehicle motion based on information relating to vehicle motion, and providing by means of an actuator, a stimulus that produces muscle tension such that the occupant assumes a posture corresponding to the vehicle motion when a predicted vehicle motion occurs.

In addition, the occupant posture control device according to the present disclosure comprises a controller that controls an actuator that provides a stimulus that produces muscle tension in an occupant, based on information relating to vehicle motion. The controller comprises a vehicle motion prediction unit, which predicts vehicle motion, and a stimulus imparting control unit, which, when a predicted vehicle motion occurs, applies, by means of an actuator a stimulus that produces muscle tension such that the occupant assumes a posture corresponding to the vehicle motion.

The occupant posture control method and the occupant posture control device according to the present disclosure provide a stimulus to the occupant by means of the actuator to generate muscle tension, which places the occupant in a posture corresponding to the vehicle motion, As opposed to the case in which the occupant's posture is stabilized by tilting the seat surface of the seat, so that it is possible to place the occupant in the desired posture in a short period of time. Consequently, the occupant assumes the optimal posture at the optimal timing with respect to the vehicle motion; thus, the occurrence of motion sickness is suppressed.

BRIEF DESCRIPTION OF THE DRAWINGS

Referring now to the attached drawings which form a part of this original disclosure.

DETAILED DESCRIPTION OF EMBODIMENTS

Embodiments for executing an occupant posture control method and an occupant posture control device according to the present disclosure will be described below based on the drawings.

The occupant posture control method and the occupant posture control device according to the first embodiment will be first described.

The occupant posture control method and the occupant posture control device according to the first embodiment are applied to an autonomous driving vehicle in which driving, braking, and the steering angle are automatically controlled so as to effect travel along a generated target travel route when an autonomous driving mode is selected.

Figure 1:
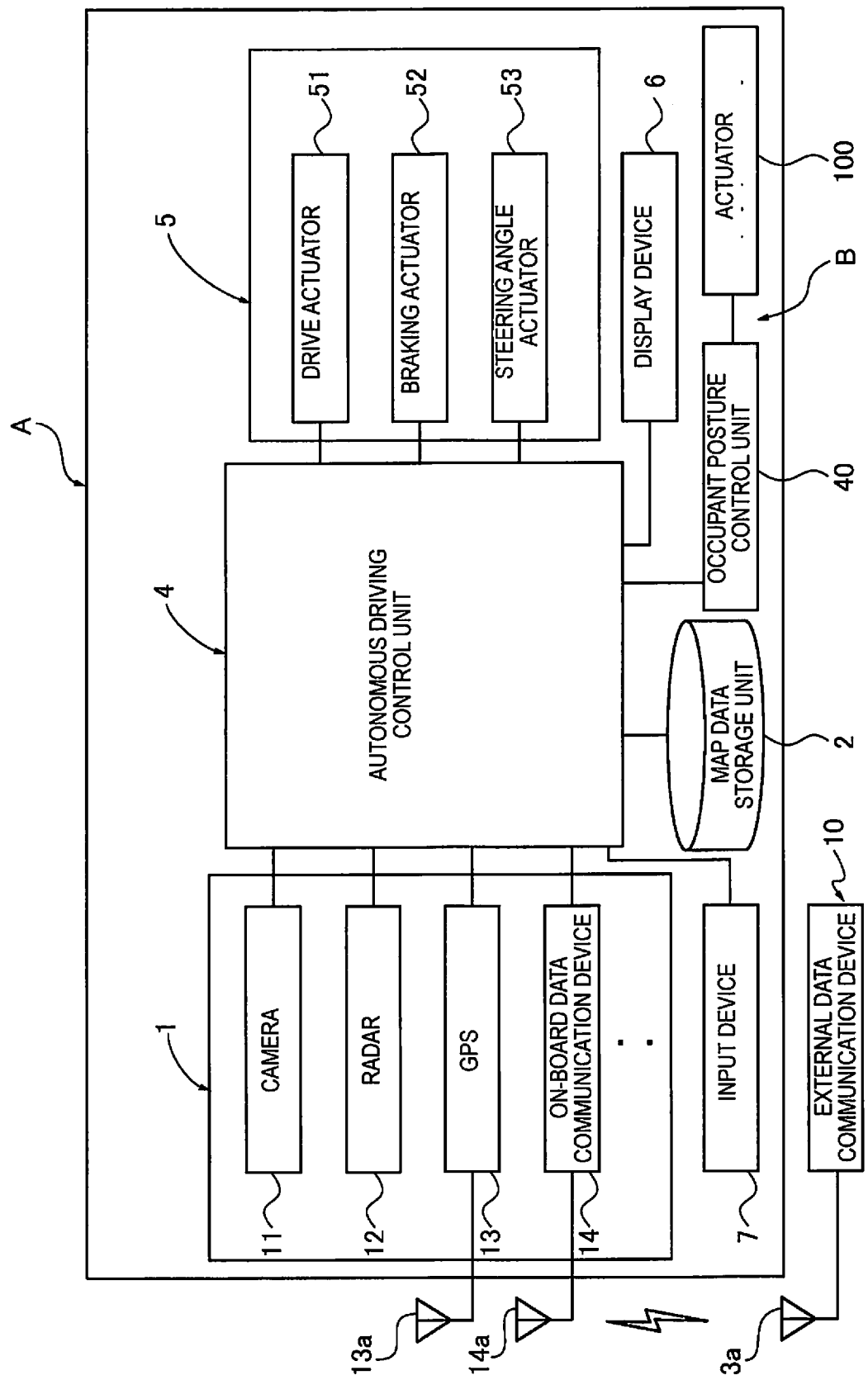
FIG. 1 is an overall system view illustrating an autonomous driving control system A that executes an occupant posture control method according to a first embodiment.

FIG. 1 illustrates an autonomous driving control system A to which the occupant posture control method and the occupant posture control device according to the first embodiment are applied. The overall system will be described below based on FIG. 1.

The autonomous driving control system A comprises an on-board sensor 1, a map data storage unit 2, an autonomous driving control unit 4, a control actuator 5, a display device 6, and an input device 7. An occupant posture control unit B that executes the occupant posture control method is incorporated in the autonomous driving control system A. The occupant posture control unit B shares input information with the autonomous driving control unit 4 and uses the control information of the autonomous driving control unit 4 to execute posture control of the occupant Pa (refer to FIG. 6).

The on-board sensor 1 includes a camera 11, a radar 12, a GPS 13, and an on-board data communication device 14. In addition, sensor information acquired with the on-board sensor 1 is output to the autonomous driving control unit 4. In addition to the camera 11 and the radar 12, the on-board sensor 1 includes, a sensor that outputs sensor information relating to vehicle motion of a host vehicle MVS (refer to FIG. 6); these sensors will be described further below. Vehicle motion refers to the displacement of the vehicle over time, and specifically refers to the acceleration/deceleration and the turning of the vehicle, as well as the accompanying changes in the posture of the vehicle, and the like.

The camera 11 is a surroundings recognition sensor that realizes a function to acquire, by means of image data, peripheral information of a host vehicle MVS such as lanes, preceding vehicles, pedestrians, and the like, as a function required for autonomous driving. This camera 11 is configured, for example, by combining a front recognition camera, a rear recognition camera, a right recognition camera, a left recognition camera, and the like of the host vehicle MVS.

The host vehicle MVS is a vehicle in which the autonomous driving control system A is installed, and indicates the vehicle being controlled.

It is possible to detect, from camera images, objects and lanes on a host vehicle travel path and objects outside of the host vehicle travel path (road structures, preceding vehicles, trailing vehicles, oncoming vehicles, surrounding vehicles, pedestrians, bicycles, two-wheeled vehicles), the host vehicle travel path (white road lines, road boundaries, stop lines, pedestrian crossings, road signs, speed limits, etc.), and the like.

The radar 12 is a ranging sensor that realizes a function to detect the presence of an object in the vicinity of the host vehicle and a function to detect the distance to the object in the vicinity of the host vehicle, as functions required for autonomous driving. Here, "radar 12" is a generic term that includes radars using radio waves, lidars using light, and sonars using ultrasonic waves. Examples of a radar 12 that can be used include a laser radar, a millimeter wave radar, an ultrasonic radar, a laser range finder, or the like. This radar 12 is configured, for example, by combining a front radar, a rear radar, a right radar, a left radar, and the like of the host vehicle MVS.

The radar 12 detects the positions of objects on a host vehicle travel path and objects outside of the host vehicle travel path (road structures, preceding vehicles, trailing vehicles, oncoming vehicles, surrounding vehicles, pedestrians, bicycles, two-wheeled vehicles), as well as the distance to each object. If the viewing angle is insufficient, radars may be added as deemed appropriate.

The GPS 13 is a host vehicle position sensor that has a GNSS antenna 13a and that detects the host vehicle position (latitude and longitude) when the vehicle is stopped or in motion by using satellite communication. "GNSSS" is an acronym for "Global Navigation Satellite System" and "GPS" is an acronym for "Global Positioning System."

The on-board data communication device 14 is an external data sensor that carries out wireless communication with the external data communication device 10 via transceiver antennas 3a, 14a in order to acquire from the outside information that cannot be acquired by the host vehicle MVS.

For example, in the case of a data communication device mounted on another vehicle traveling in the vicinity of the host vehicle MVS, the external data communication device 10 carries out vehicle-to-vehicle communication between the host vehicle MVS and the other vehicle. By means of this vehicle-to-vehicle communication, information needed by the host vehicle MVS (refer to FIG. 6) can be acquired from among the various pieces of information held by the other vehicle by means of a request from the on-board data communication device 14.

For example, in the case of a data communication device provided in an infrastructure equipment, the external data communication device 10 carries out infrastructure communication between the host vehicle MVS and the infrastructure equipment. By means of this infrastructure communication, information required by the host vehicle MVS can be acquired from among the various pieces of information held by the infrastructure equipment by means of a request from the on-board data communication device 14. For example, if there is insufficient information in the map data stored in the map data storage unit 2 or information that has been updated from the map data, the insufficient information or updated information can be supplemented. It is also possible to acquire traffic information such as traffic congestion information and travel restriction information for the target travel route on which the host vehicle MVS is scheduled to travel.

The map data storage unit 2 is composed of an on-board memory that stores so-called electronic map data in which latitude/longitude are associated with map information. The map data stored in the map data storage unit 2 are high-precision map data having a level of precision with which it is possible to recognize at least each of the lanes of a road that has a plurality of lanes. By using such high-precision map data, it is possible to generate the target travel route, indicating in which lane from among the plurality of lanes the host vehicle MVS would travel via autonomous driving. Then, when the host vehicle position detected by the GPS13 is recognized as the host vehicle position information, the high-precision map data around the host vehicle position are set to the autonomous driving control unit 4.

The high-precision map data includes road information associated with each point, and the road information is defined by nodes and links that connect the nodes. The road information includes information for identifying the road from the location and area of the road, a road type for each road, a lane width for each road, and road shape information. For each piece of identification information of each road link, the road information is stored in association with the location of the intersection, directions of approach to the intersection, the type of intersection, and other intersection-related information. For each piece of identification information of each road link, the road information is stored in association with the road type, the lane width, the road shape, whether through traffic is possible, right-of-way, whether passing is possible (whether or not entering an adjacent lane is possible), the speed limit, signs, and other road-related information.

The autonomous driving control unit 4 has a function for integrating information input from the on-board sensor 1 and the map data storage unit 2 to generate the target travel route, a target vehicle speed profile (including an acceleration profile and a deceleration profile.), and the like. That is, the target travel route at the travel lane level from the current position to a given destination is generated based on a prescribed route search method, the high-precision map data from the map data storage unit 2, and the like, and the target vehicle speed profile, etc., along the target travel route are generated. In addition, when it is determined that the autonomous driving cannot be maintained as a result of sensing with the on-board sensor 1 while the host vehicle MVS is stopped or traveling along the target travel route, the target travel route, the target vehicle speed profile, and the like, are sequentially corrected.

When the target travel route is generated, the autonomous driving control unit 4 calculates a drive command value, a braking command value, and a steering angle command value such that the host vehicle MVS travels along the target travel route and outputs the calculated command values to the actuator 5. Specifically, the calculation result of the drive command value is output to a drive actuator 51, the calculation result of the braking command value is output to a braking actuator 52, and the calculation result of the steering angle command value is output to a steering angle actuator 53.

The control actuator 5 causes the host vehicle MVS to travel and stop along the target travel path and includes the drive actuator 51, the braking actuator 52, and the steering angle actuator 53.

The drive actuator 51 receives drive command values input from the autonomous driving control unit 4 and that controls the driving force that is output to drive wheels.

Examples of the drive actuator 51 that can be used include an engine in the case of an engine-powered vehicle, an engine and a motor/generator (power running) in the case of a hybrid vehicle, and a motor/generator (power running) in the case of an electric vehicle.

The braking actuator 52 receives braking command values input from the autonomous driving control unit 4 and controls the braking force that is output to the drive wheels. Examples of the braking actuator 52 that can be used include a hydraulic booster, an electric booster, a brake fluid pressure actuator, a brake motor actuator, and a motor/generator (regeneration).

The steering angle actuator 53 receives steering angle command values input from the autonomous driving control unit 4 and controls the steering angle of the steered wheels. Examples of the steering angle actuator 53 that can be used include a steering motor, or the like, that is provided in a steering force transmission system of a steering system.

The display device 6 displays on a screen the position of the moving host vehicle MVS on the map to provide the occupants Pa (refer to FIG. 6) such as the driver and fellow occupants with visual information of the host vehicle's location when the vehicle is stopped or traveling by means of autonomous driving. The display device 6 inputs target travel route information, host vehicle position information, destination information, and the like generated by the autonomous driving control unit 4, and displays on the display screen a map, roads, the target travel route (travel route of the host vehicle MVS), the host vehicle location, the destination, and the like, in an readily visible manner.

The input device 7 carries out various inputs by means of driver operation, for which purpose a touch panel function of the display device 6 may be used, for example, as well as other dials and switches. Examples of inputs carried out by the driver include input of information relating to the destination and input of settings such as constant speed travel and following travel during autonomous driving, and the like.

The host vehicle MVS further comprises the occupant posture control unit B that provides a stimulus that produces muscle tension such that the occupant Pa assumes a posture corresponding to the vehicle motion of the host vehicle MVS. The occupant posture control unit B includes an actuator 100 that drives a seat and that provides a stimulus that produces muscle tension in the occupant Pa, and the occupant posture control unit 40 that controls the operation of the actuator 100. In the first embodiment, the occupant posture control unit 40 executes a lateral acceleration swing-back posture control in which the occupant Pa assumes a posture corresponding to swing-back as the host vehicle MVS makes a turn, and a negative acceleration swing-back posture control in which the occupant Pa assumes a posture corresponding to the swing-back during decelerated travel.

Figure 6:
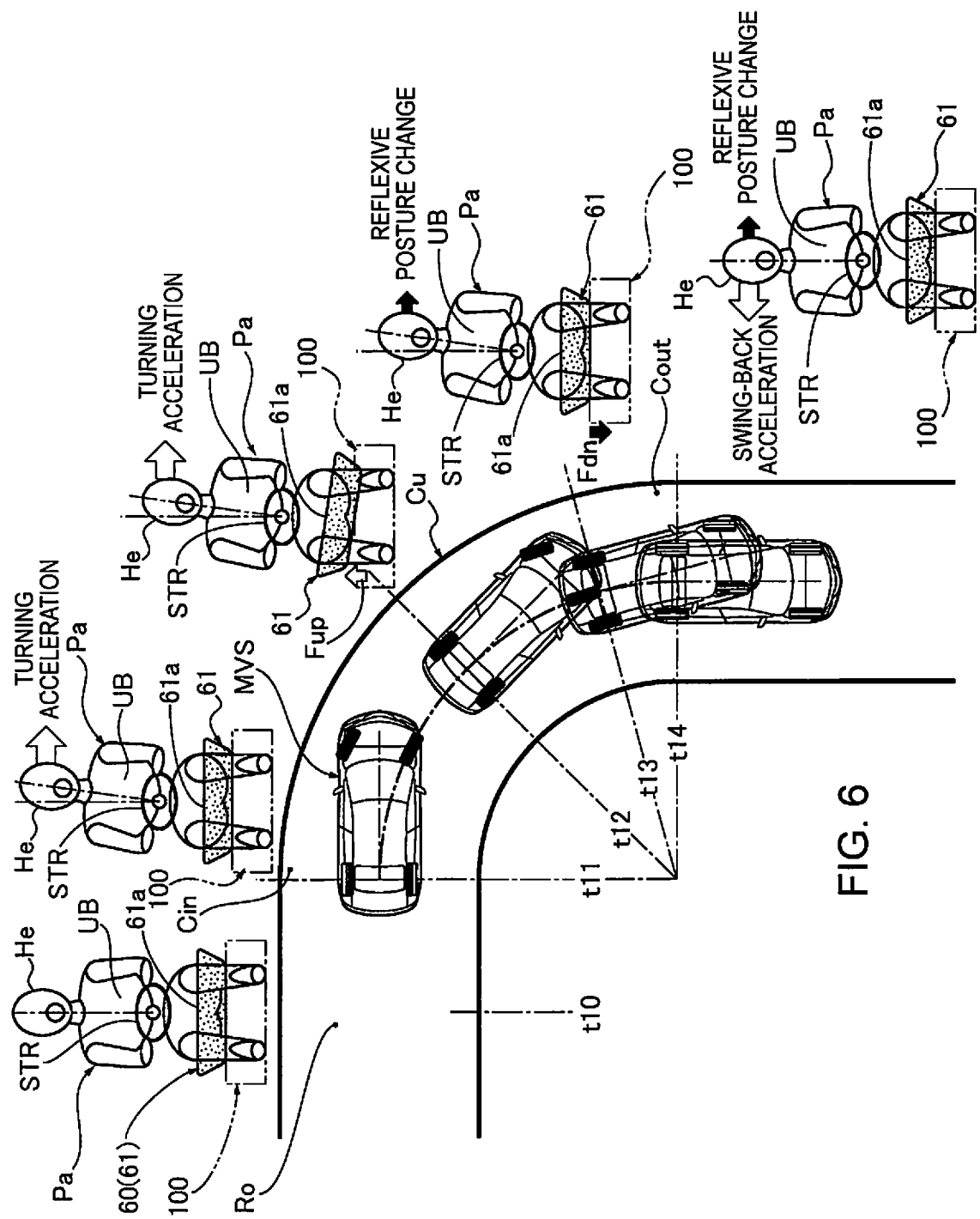
FIG. 6 is a time chart illustrating vehicle motion of a host vehicle MVS, changes in the posture of an occupant Pa, and changes in a seat surface 61*a* (stimulus applied state), when a lateral acceleration swing-back posture control is executed during travel through a curve.

Here, as shown in FIG. 6, a swing-back during a turn is a motion in which, when the host vehicle MVS travels through a curve Cu, the upper body UB and the head He of the occupant Pa, which had been temporarily rocked in the outward direction of the turn, are swung back toward the inward direction of the turn in the vicinity of a curve exit Cout.

In addition, swing-back during decelerated travel is a motion in which the upper body UB and the head He of the occupant Pa, which had been rocked toward the front of the vehicle due to a negative acceleration toward the front of the vehicle generated when the host vehicle MVS is braked, are swung back toward the rear of the vehicle due to a decrease in the negative acceleration due to stopping or release of the brakes.

Figure 7:
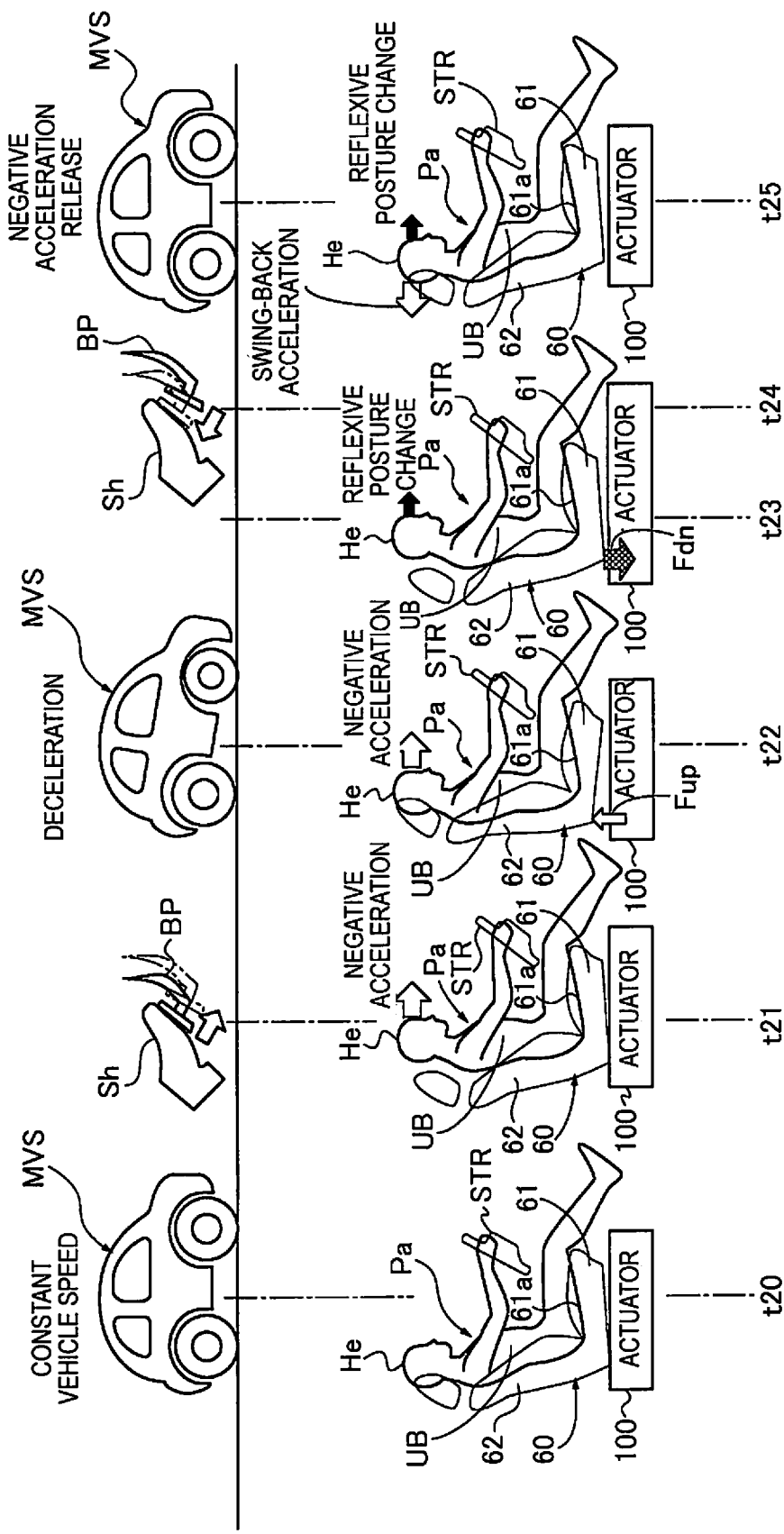
FIG. 7 is a time chart illustrating the vehicle motion of the host vehicle MVS, changes in the posture of the occupant Pa, and changes in the seat surface 61*a* (stimulus applied state), when a negative acceleration swing-back posture control is executed during decelerated travel.

The actuator that provides a stimulus that produces muscle tension in the occupant Pa will now be described. For example, an actuator that provides a stimulus for generating muscle tension in the occupant Pa may be the actuator 100 that drives seats and that is supported by the vehicle body so as to be capable of tilting a seat cushion 61 of a seat 60 shown in FIG. 6 to the left and right directions of the vehicle, or to the front and rear directions of the vehicle, as shown in FIG. 7. The seat 60 whose seat cushion 61 is tilted by the actuator 100 that drives seats is the driver's seat in FIGS. 6 and 7, but includes seats other than the driver's seat. In addition, if the seat 60 is not the driver's seat, driving of the actuator 100 that drives seats is preferably permitted when the seating of the occupant Pa is detected.

Examples of the actuator 100 that drives seats that can be used include an electric motor such as that disclosed in Patent Document 1, or one that comprises an extendable portion that extends and contracts by means of supply and discharge of fluid pressure.

Figure 8:
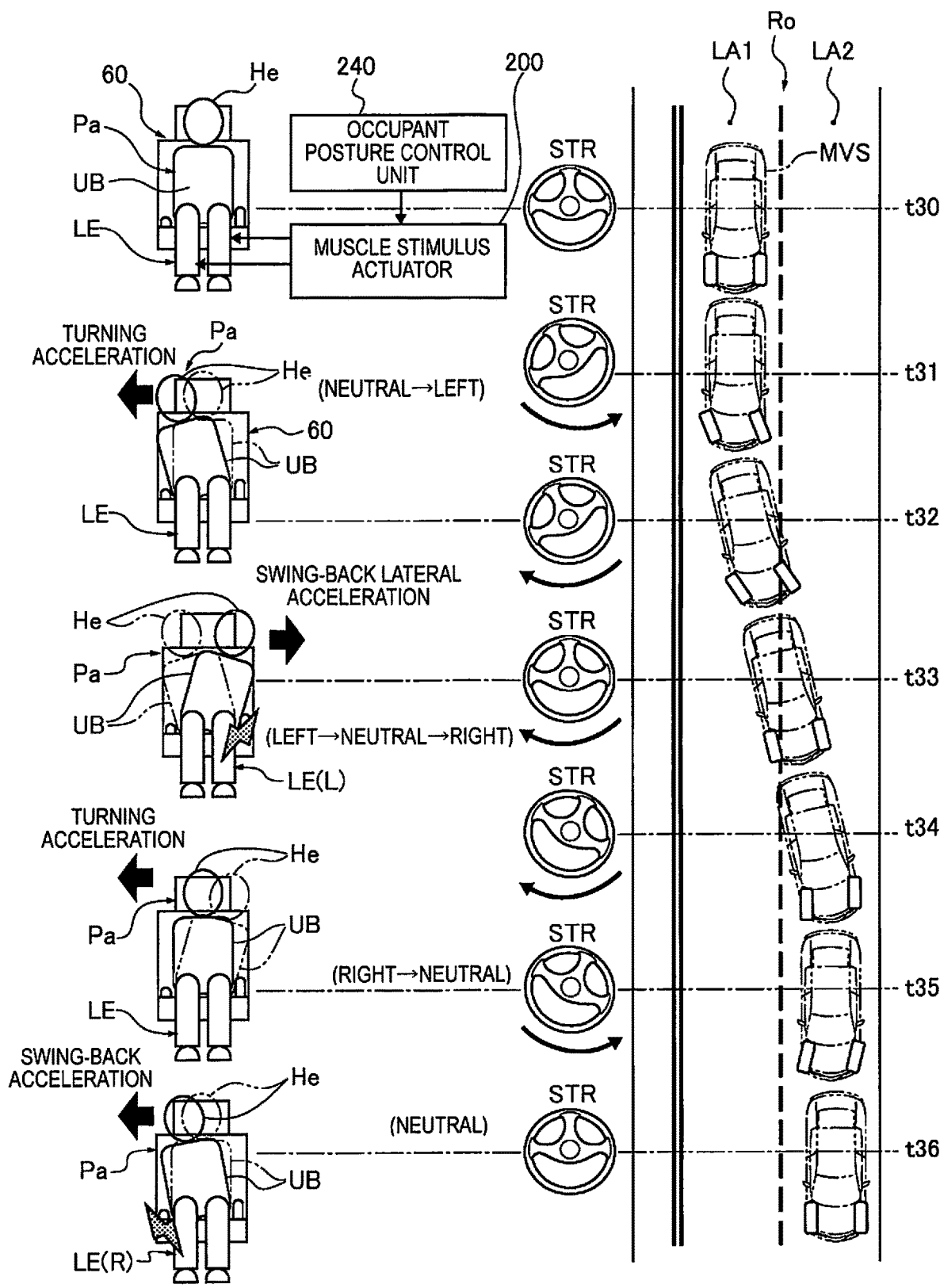
FIG. 8 is a time chart illustrating the vehicle motion of the host vehicle MVS, a steering state, a change in posture of the occupant Pa, and the stimulus applied state when a lateral acceleration swing-back process is repeatedly executed by means of a second embodiment during lane changes.

In addition, the actuator that provides a stimulus for generating muscle tension in the occupant Pa may be, for example, a muscle-stimulating actuator 200 that is provided on the seat 60 and that provides muscle stimulus to left and right legs LE of the occupant Pa, as shown in FIG. 8. This muscle-stimulating actuator 200 provides a stimulus for generating muscle tension that independently imparts posture maintenance to each of the left and right legs LE of the occupant Pa, an example being an actuator that provides an electrical stimulus to the legs LE. The method for imparting the stimulus for generating muscle tension in the occupant Pa using the muscle-stimulating actuator 200 will be described in detail in the second embodiment.

Figure 12A:
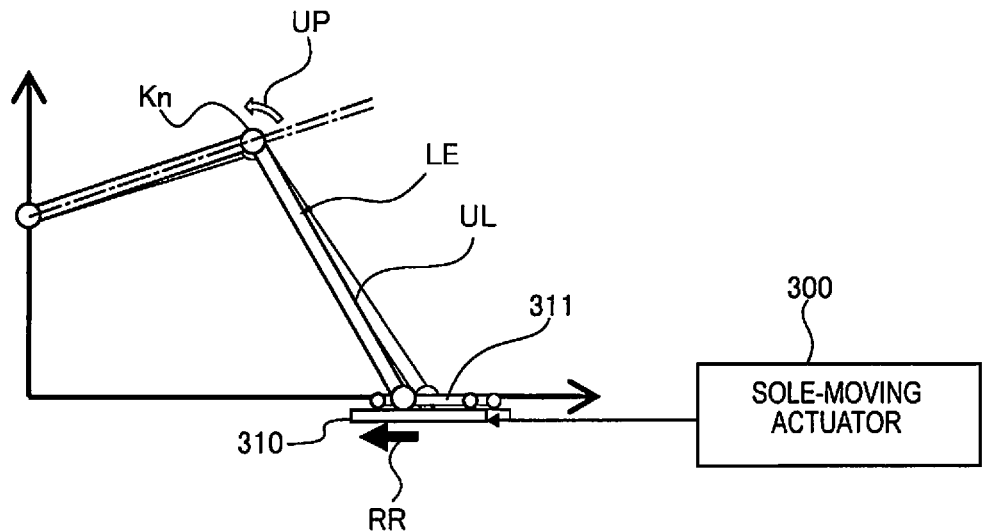
FIG. 12A is an explanatory diagram of stimulus application in a third embodiment.

In addition, the actuator that provides a stimulus for generating muscle tension in the occupant Pa may be a foot sole-moving actuator 300 that includes a moving plate 310 that has on the upper surface a tread surface 311 on which the sole of the occupant Pa is placed, and that moves the moving plate 310 in the longitudinal direction of the vehicle, or shifts the moving plate between an essentially horizontal state and a rearward-inclined state, in order to move the foot sole of the occupant Pa, as shown in FIG. 12A. Muscle tension occurs in the leg LE of the occupant Pa by means of the movement of the sole of the occupant Pa. The method for imparting the stimulus for generating muscle tension in the occupant Pa using the foot sole-moving actuator 300 will be described in detail in the third embodiment.

Figure 15A:
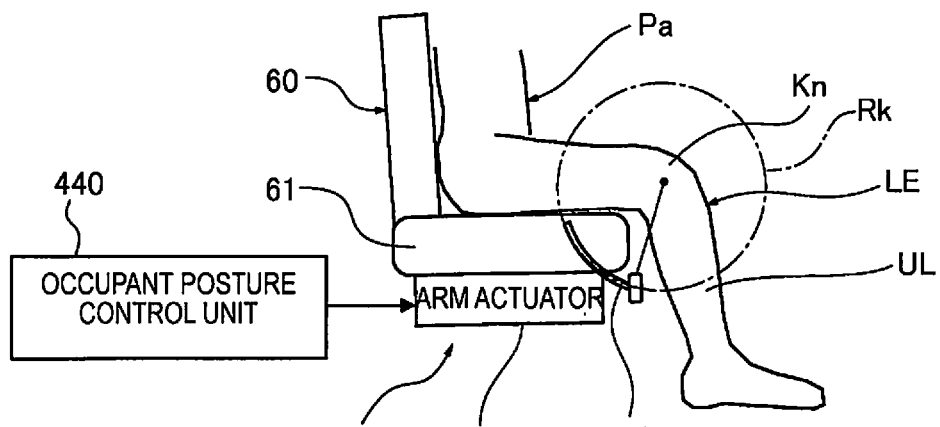
FIG. 15A is an explanatory diagram of an actuator 400 in a fourth embodiment.
Figure 15B:
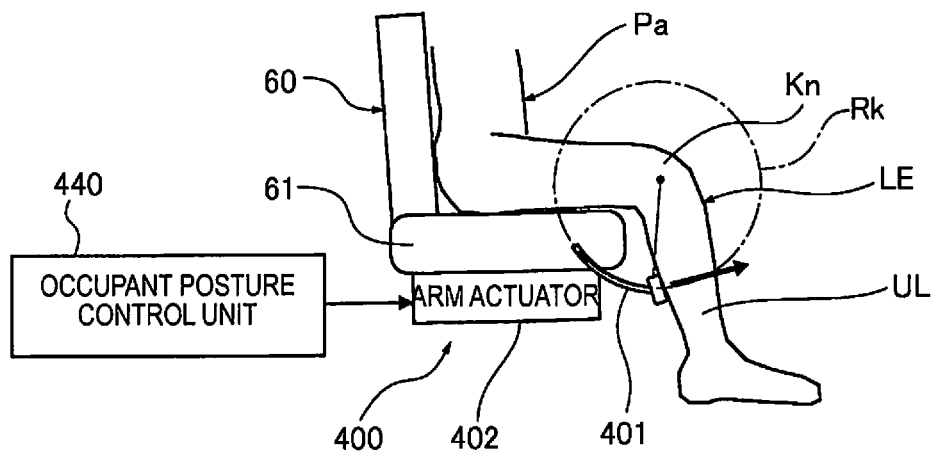
FIG. 15B is an explanatory diagram when a stimulus is applied with the actuator 400 in the fourth embodiment.

In addition, the actuator that provides a stimulus for generating muscle tension in the occupant Pa may be, for example, an actuator 400 that has an arm 401 and an arm actuator 402, shown in FIGS. 15A and 15B, and that moves the arm 401 forward to move a lower limb UL forward. Muscle tension occurs in the leg LE by means of the movement of the lower limb UL. The method for imparting the stimulus for generating muscle tension in the occupant Pa using the actuator 400 will be described in detail in the fourth embodiment.

Figure 16A:
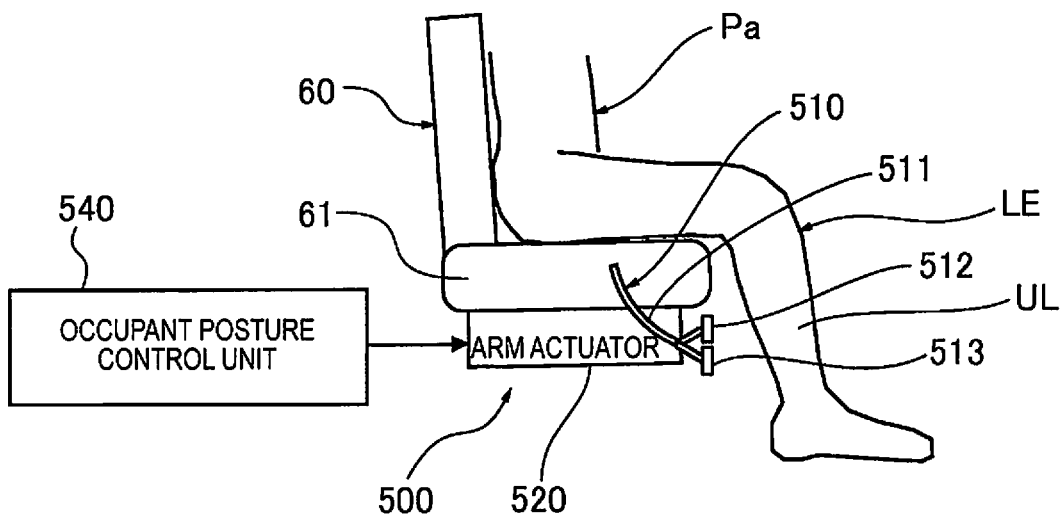
FIG. 16A is an explanatory diagram of an actuator 500 in a fifth embodiment.
Figure 16B:
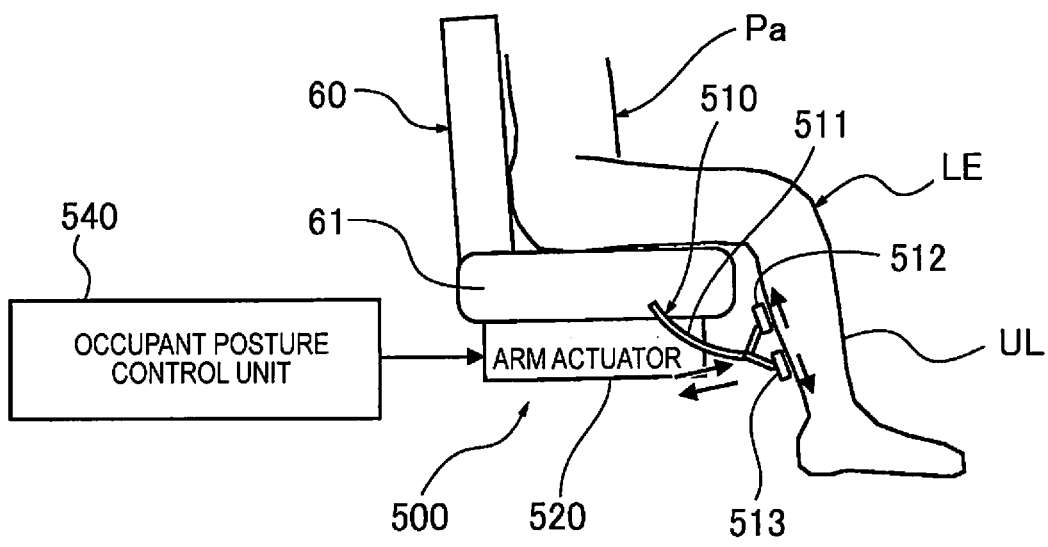
FIG. 16B is an explanatory diagram when a stimulus is applied with the actuator 500 in the fifth embodiment.
Figure 16C:
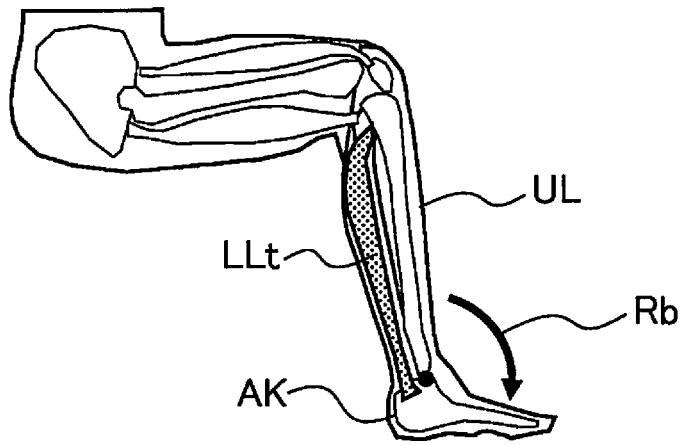
FIG. 16C is an explanatory diagram of the muscle tension caused by the stimulus application in the fifth embodiment.

In addition, the actuator that provides a stimulus for generating muscle tension in the occupant Pa may be, for example, an actuator 500 provided on the seat cushion 61 and that has an arm 510 and an arm actuator 520, as shown in FIGS. 16A and 16B. The actuator 500 moves an arm body 511 forward and causes an upper operating portion 512 and a lower operating portion 513 to come into contact with the lower limb UL at the position of the triceps surae LLt. In addition, the upper operating portion 512 and the lower operating portion 513 are turned relative to the arm body 511 so as to separate from each other in the vertical direction. The occupant Pa thereby receives a stimulus that stretches the triceps surae LLt, and muscle tension occurs as a reflex thereto. The method for applying the stimulus for generating muscle tension in the occupant Pa using the actuator 500 will be described in detail in the fifth embodiment.

In addition, the actuator that provides a stimulus for generating muscle tension in the occupant Pa may be an actuator that provides a stimulus that pokes the upper body UB of the occupant Pa on the side of the body (for example, the side or the back) in the same direction as the direction of movement (direction in which acceleration acts).

Further, a warm/cold sensation stimulus may be used as the stimulus that can impart a change in posture by means of the actuator that provides a stimulus for generating muscle tension in the occupant Pa. For example, a cold object, including a fluid, or a hot object, including a fluid, may be brought into contact with the occupant Pa in order to produce a change in posture by means of muscle tension caused by a reflex to move away from these objects.

In addition to warm/cold sensation stimuli, optical stimuli, and auditory stimuli, gustatory stimuli can be used. For example, it is known that neck muscles will contract in response to a sour taste stimulus.

In addition, the actuator that provides a stimulus for generating muscle tension in the occupant Pa may be an actuator that provides a stimulus by generating sound or light with an actuator, without making direct contact with the occupant Pa. For example, as an example of an auditory stimulus, an actuator that provides a stimulus by generating a change in the position of a sound field, a change in sound pressure, or a rhythm may be used.

The occupant posture control unit 40 will be described next.

Figure 2:
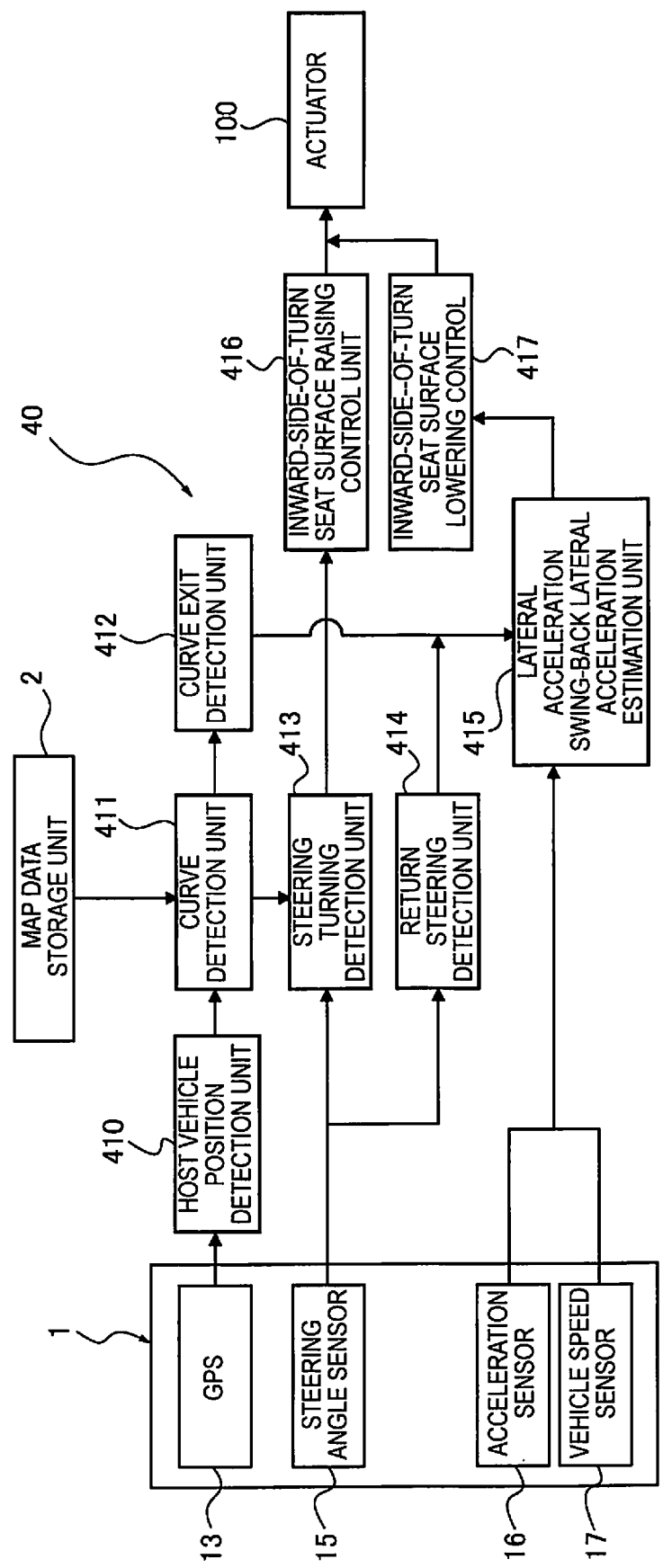
FIG. 2 is a block diagram illustrating elements that execute a lateral acceleration swing-back posture control in an occupant posture control unit 40 of the autonomous driving control system A.

FIG. 2 is a block diagram illustrating elements that execute the lateral acceleration swing-back posture control in the occupant posture control unit 40.

The occupant posture control unit 40 comprises a host vehicle position detection unit 410, a curve detection unit 411, a curve exit detection unit 412, a steering turning detection unit 413, a return steering detection unit 414, a lateral acceleration swing-back estimation unit 415, an inward-side-of-turn seat surface raising control unit 416, and an inward-side-of-turn seat surface lowering control unit 417. Sensors included in the on-board sensor 1 include a steering angle sensor 15 that detects the steering angle (including the turning angle), an acceleration sensor 16 that detects the acceleration that acts on the host vehicle MVS in the longitudinal direction as well as the lateral direction of the vehicle, and a vehicle speed sensor 17 that detects the vehicle speed of the host vehicle MVS.

Figure 3:
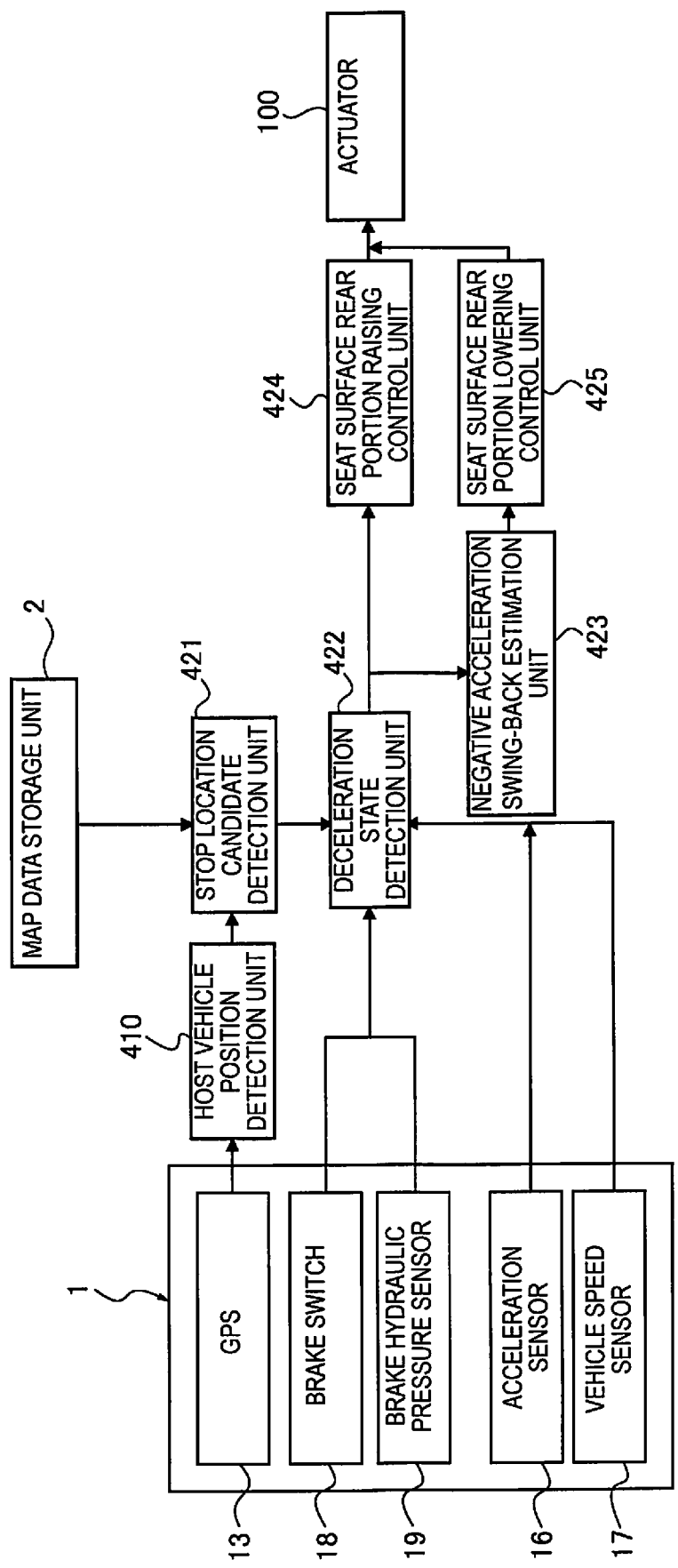
FIG. 3 is a block diagram illustrating elements that execute a negative acceleration swing-back posture control in the occupant posture control unit 40.

FIG. 3 is a block diagram illustrating elements that execute the negative acceleration swing-back posture control in the occupant posture control unit 40. As shown in FIG. 3, the occupant posture control unit 40 comprises the host vehicle position detection unit 410, a stop location candidate detection unit 421, a deceleration state detection unit 422, a negative acceleration swing-back estimation unit 423, a seat surface rear portion raising control unit 424, and a seat surface rear portion lowering control unit 425. Sensors included in the on-board sensor 1 include a brake switch 18 that is turned on by means of a braking operation of a brake device, and a brake hydraulic pressure sensor 19 that detects the hydraulic pressure of the brake device.

Figure 4:
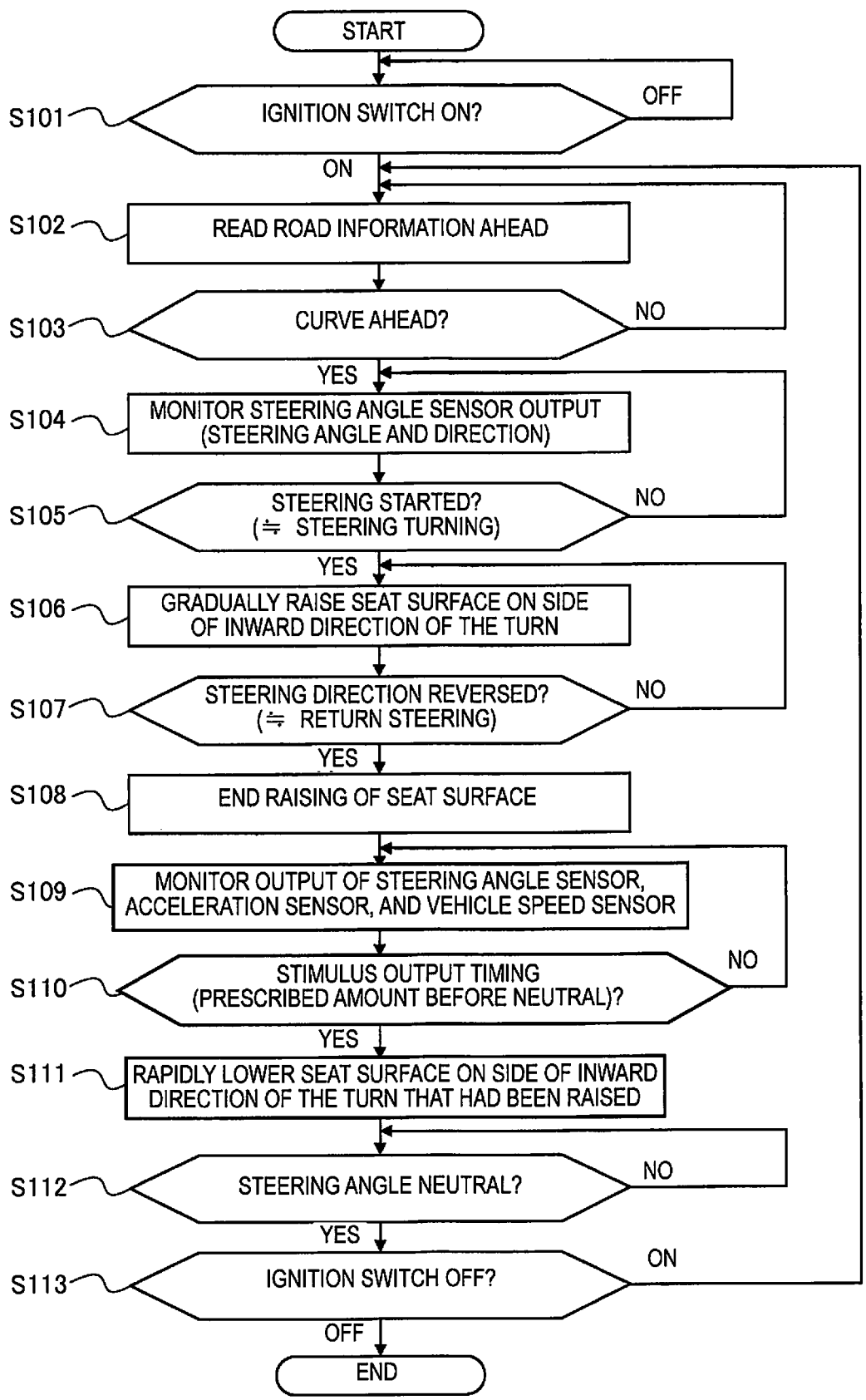
FIG. 4 is a flowchart illustrating a process flow of the lateral acceleration swing-back posture control.

The flow of a process of the lateral acceleration swing-back posture control by the occupant posture control unit 40 will be described next based on the flowchart of FIG. 4; in addition, the elements that execute the lateral acceleration swing-back posture control shown in the block diagram of FIG. 2 will be described.

In Step S101, a determination is made whether an ignition switch of the host vehicle MVS is on; if the switch is on, the process proceeds to the next Step S102, and if it is off, Step S101 is repeated. The ignition switch is a switch that is turned on during starting.

In Step S102, road information ahead of a road Ro on which the host vehicle MVS travels is read, and in the next Step S103, a determination is made whether there is a curve Cu at a prescribed distance ahead of the host vehicle MVS. Then, if there is a curve Cu on the road at a prescribed distance ahead of the host vehicle MVS (YES), the process proceeds to the next Step S104, and if there is no curve Cu (NO), the process returns to Step S102. The processes of these Steps S102 and S103 are executed by the host vehicle position detection unit 410 and the curve detection unit 411 shown in FIG. 2, based on peripheral information of the host vehicle MVS and GPS information obtained from the on-board sensor 1, as well as on map information obtained from the map data storage unit 2.

In Step S104, to which the process proceeds when it is determined that a curve Cu is present ahead of the host vehicle MVS, the steering state is monitored with a signal from the steering angle sensor 15. That is, the steering angle and the direction in which the host vehicle MVS travels are monitored.

In the next Step S105, a determination is made whether steering has been started in accordance with the curve Cu (whether steering turning has been carried out). Then, if steering has been started, the process proceeds to Step S106, and if steering has not been started, the process returns to Step S104. The processes of Steps S104 and S105 are carried out by the steering turning detection unit 413 shown in FIG. 2. In the case of manual driving, it can be determined from the actual steering angle of a steering wheel STR. Furthermore, since the first embodiment is applied to the autonomous driving control system A, during autonomous driving, the start of steering can be determined not from the actual steering angle of the steering wheel STR, but from a turning angle of turning wheels, a target turning angle, or the like.

Further, in Step S106, to which the process proceeds when steering is started, a control is started to cause the actuator 100 that drives seats to gradually rise (refer to arrow Fup of FIG. 6) the inward direction of the turn (inward of the curve Cu)-side of the seat surface 61*a* (refer to FIGS. 6 and 7) of the seat cushion 61, as a preparation process for the posture control. In addition, this raising of the inward direction of the turn side of the seat surface 61*a* is executed by the inward-side-of-turn seat surface raising control unit 416 shown in FIG. 2. This elevation of the inward direction of the turn side of the seat surface 61*a* is carried out such that the desired amount of elevation can be obtained by the time at which the host vehicle MVS approaches the curve exit Cout and return steering is started. Here, the time required between the start of steering at a curve Cu to the start of return steering is usually 1 to several seconds, the required elevation is approximately several millimeters to 1 to 2 cm, and the raising of the seat surface 61*a* is carried out gradually so as not to stimulate the occupant Pa.

In Step S107, to which the process proceeds after the start of the raising of the seat surface 61*a*, a determination is made whether the steering direction of the steering wheel STR has reversed; if the steering direction has reversed, the process proceeds to the next Step S108, and if it has not reversed, the process proceeds to Step S106. The detection of the start of return steering is carried out by the return steering detection unit 414 shown in FIG. 2 based on detection of the steering angle sensor 15.

In Step S108, to which the process proceeds when the steering direction has reversed, the raising of the seat surface 61*a* by the inward-side-of-turn seat surface raising control unit 416 is ended. Then, in the next Step S109, outputs from the steering angle sensor 15, the acceleration sensor 16, the vehicle speed sensor 17, and the like, are read, and based on these pieces of information, in Step S110, a determination is made whether it is a timing to output stimulus for imparting muscle tension. The determination of this timing to output a stimulus for imparting muscle tension is carried out by estimation of the lateral acceleration swing-back by the lateral acceleration swing-back estimation unit 415 shown in FIG. 2. This lateral acceleration swing-back estimation unit 415 calculates the timing immediately before the steering angle returns to the neutral position based on the detection of the curve exit Cout by the curve exit detection unit 412, the detection of the return steering by the return steering detection unit 414 based on the steering angle sensor 15, and the acceleration and vehicle speed of the host vehicle MVS. The neutral position refers to the steering angle during travel in a straight line.

In addition, this timing to output a stimulus for imparting muscle tension is essentially for detecting the time immediately before swing-back lateral acceleration acts on the occupant Pa, and the timing is dependent on the steering angular velocity, the lateral acceleration, the vehicle speed, the elasticity characteristics of the suspension and seat 60, and the like. For this reason, this timing is obtained using maps and mathematical equations corresponding to the steering angular velocity, vehicle speed, lateral acceleration, etc., based on simulation and experiments using actual vehicles.

Then, if it is determined to be the timing to start posture control in Step S110, the process proceeds to Step S111, and control is carried out to actuate the actuator 100 to immediately lower the raised seat surface 61*a* to the original position. This lowering of the seat surface 61*a* is executed by the inward-side-of-turn seat surface lowering control unit 417.

In Step S112, to which the process proceeds after the rapid lowering of the seat surface 61*a* in Step S111, a determination is made whether the steering wheel STR (steering angle) has returned to the neutral position; if it has returned to the neutral position, the process proceeds to Step S113 and the determination of Step S112 is repeated until it has returned to the neutral position. Then, in Step S113, a determination is made whether the ignition switch has been turned off; if it is off, the control is ended; otherwise, the process returns to Step S102.

Figure 5:
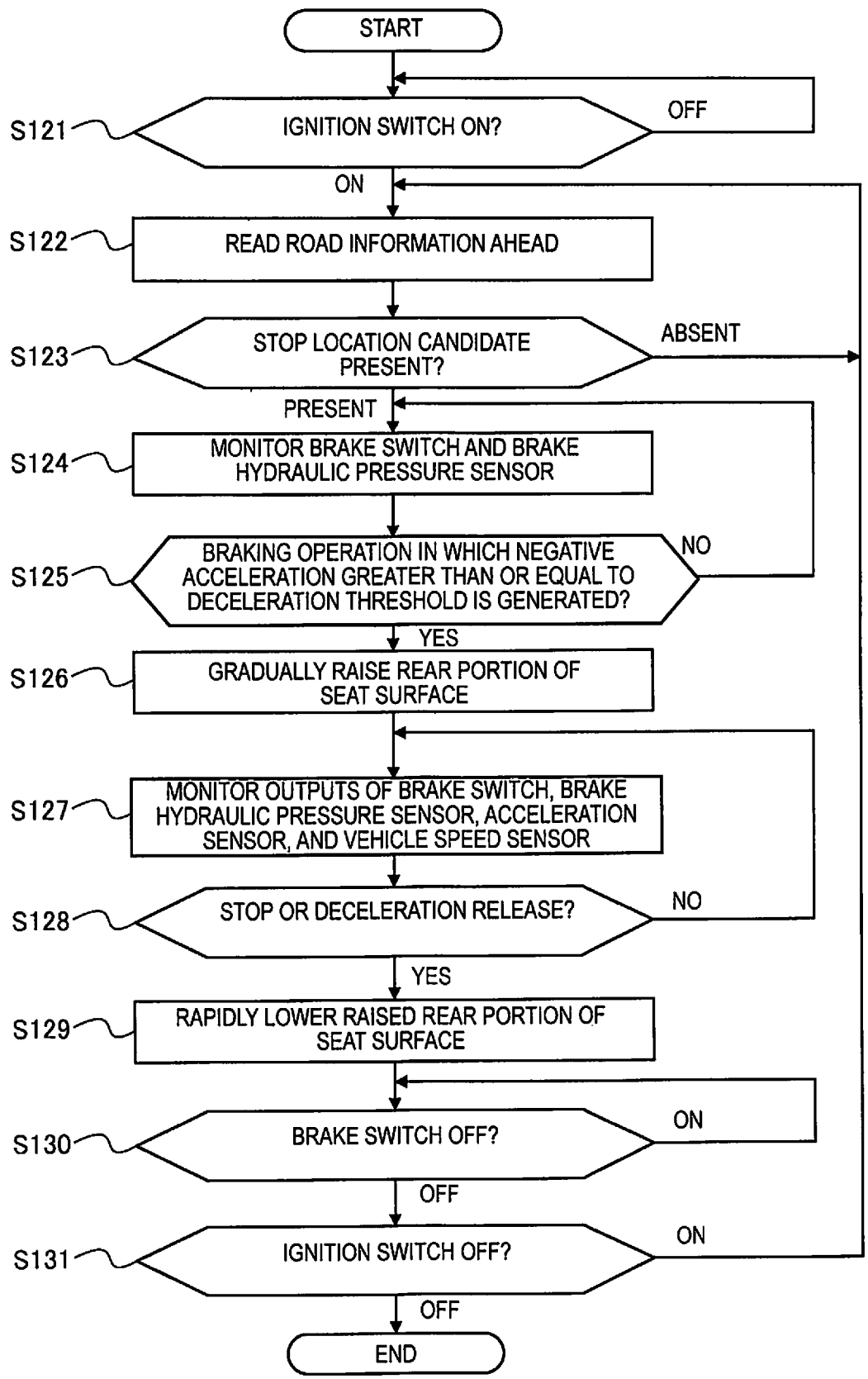
FIG. 5 is a flowchart illustrating a process flow of the negative acceleration swing-back posture control.

The flow of a process of the negative acceleration swing-back posture control by the occupant posture control unit 40 will be described next based on the flowchart of FIG. 5; in addition, the elements that execute the negative acceleration swing-back posture control shown in the block diagram of FIG. 3 will be described. The negative acceleration swing-back posture control is executed in parallel with the lateral acceleration swing-back posture control described above.

In Step S121, a determination is made whether the ignition switch of the host vehicle MVS is on; if it is on, the process proceeds to the next Step S122, and if it is off, Step S121 is repeated.

In Step S122, road information ahead of the host vehicle MVS is read, and in the next Step S123, a determination is made whether there is a stop location candidate at which the host vehicle MVS may stop ahead of the host vehicle MVS. In the first embodiment, stop location candidates include intersections and stop sign locations. Here, stop location candidates are places where the vehicle may stop; for example, at an intersection, there is the possibility of passing through without stopping, depending on the type of traffic signal. In addition, such stop location candidates may include, in addition to stop points, locations at which deceleration is carried out at a certain degree of negative acceleration, such as the toll plaza of a toll road. In short, it is sufficient if locations at which swing-back caused by deceleration travel occurs can be determined.

Then, if there is a stop location candidate on the road Ro on which the vehicle is traveling ahead of the host vehicle MVS, the process proceeds to the next Step S124, and if there is no stop location candidate, the process returns to Step S122. The processes of these Steps S122 and S123 are executed by the host vehicle position detection unit 410 and the stop location candidate detection unit 421 shown in FIG. 3, based on peripheral information of the host vehicle MVS and GPS information obtained from the on-board sensor 1, as well as on map information obtained from the map data storage unit 2.

In Step S124, to which the process proceeds when it is determined that there is a stop location candidate ahead of the host vehicle MVS, signals of the brake switch 18 and the brake hydraulic pressure sensor 19 are read to monitor the braking state. The front of the host vehicle MVS is defined as a position before the point at which braking is started and that is temporally close to the point at which braking is started. When the host vehicle MVS is a vehicle that carries out regenerative braking, a target regenerative braking command is also monitored. In the next Step S125, a determination is made whether a braking operation, which includes a braking control in which negative acceleration that is greater than or equal to a preset deceleration threshold is generated, has been carried out.

Then, if a braking operation in which negative acceleration that is greater than or equal to the deceleration threshold is generated has been carried out, the process proceeds to Step S126, and if a braking operation in which negative acceleration that is greater than or equal to the deceleration threshold is generated has not been carried out, the process returns to Step S124.

The deceleration threshold is a value set as the deceleration at which swing-back may occur to the occupant Pa in the longitudinal direction of the vehicle. In addition, since the swing-back that acts on the occupant Pa in the longitudinal direction of the vehicle is affected not only by deceleration but also by various vehicle characteristics, such as the rigidity of the vehicle body, the elasticity of the suspension, and the elasticity and hardness of the seat cushion 61, so that the deceleration threshold is set in advance to an optimal value based on experiment and simulation. In addition, in Steps S124 and S125, the longitudinal acceleration of the vehicle may be detected by the acceleration sensor 16, and it may be determined whether the detected negative acceleration or a predicted value of the negative acceleration is greater than or equal to the deceleration threshold.

In Step S126, to which the process proceeds if a braking operation, in which negative acceleration that is greater than or equal to the deceleration threshold is generated, has been carried out, a process is carried out to control the actuator 100 to gradually raise the rear portion of the seat surface 61a of the seat cushion 61, as a preparatory process for posture control. This raising operation is carried out by the seat surface rear portion raising control unit 424 from the start of braking to immediately before the negative acceleration swing-back occurs, and the amount of elevation is approximately several millimeters to 1 to 2 centimeters, in the same manner as in Step S106.

In Step S127, to which the process proceeds after the start of the raising of the seat surface 61a, the outputs of the brake switch 18, the brake hydraulic pressure sensor 19, the acceleration sensor 16, and the vehicle speed sensor 17 are read to monitor the braking state, and the process proceeds to Step S128.

In Step S128, a determination is made whether the host vehicle MVS is if the vehicle is about to come to a stop or stop slowing down, the process proceeds to Step S129, and if the vehicle is not about to come to a stop or stop slowing down, the process returns to Step S127. The determination of being just about to come to a stop or stop slowing down is carried out by the negative acceleration swing-back estimation unit 423, and, essentially, in Step S128, the timing immediately before the head He and the upper body UB, which had been moved forward due to deceleration, are swung back toward the rear of the vehicle is determined.

In Step S129, to which the process proceeds in the case that the host vehicle MVS is about to come to a stop or stop slowing down, the operation of the actuator 100 is controlled such that the rear portion of the seat surface 61a that had been raised is rapidly lowered to its original height. The control of the lowering of the rear portion of the seat surface 61a by the actuator 100 is carried out by the seat surface rear portion lowering control unit 425

In Step S130, to which the process proceeds after the lowering of the rear portion of the seat surface 61a in Step S129, a determination is made whether the brake switch 18 has been turned off; if off, the process proceeds to Step S131, and the determination of Step S130 is repeated until the switch is turned off. In the next Step S131, a determination is made whether the ignition switch has been turned off; if off, the control is ended, and if not off (is on), the process returns to Step S122.

Next, the action of the first embodiment will be described. In describing this action, a case in which the lateral acceleration swing-back posture control is executed during travel on a curve Cu will be described first, based on FIG. 6.

FIG. 6 shows the changes in the vehicle posture (vehicle motion) of the host vehicle MVS and the changes in the posture of the occupant Pa, when, from a steady state at time t10, the vehicle starts to turn in the right direction from a curve entrance Cin of the curve Cu, passes the curve exit Cout, and returns the steering angle to the neutral position. In FIG. 6, the driver is shown as the occupant Pa, but the occupant Pa is not limited to the driver. Although autonomous driving travel by the autonomous driving control unit 4 is explained as an example in the following description, it can also be applied to a case in which the driver manually operates the steering wheel STR.

The process flow of the lateral acceleration swing-back posture control during travel through a curve Cu will be described below, step by step.

During travel, the occupant posture control unit 40 determines whether there is a curve Cu ahead on the road Ro on which the host vehicle MVS is traveling (S101, S102, S103). Then, when there is the curve Cu shown in FIG. 6 ahead of the host vehicle MVS, the output of the steering angle sensor 15 is read and the start of steering (steering turning) is determined (S103, S104).

The autonomous driving control unit 4 starts steering at time t11 when the host vehicle MVS reaches the curve entrance Cin to turn. As the turning starts due to the start of steering, lateral acceleration is generated in the host vehicle MVS in the outward direction of the turn (vehicle left direction in FIG. 6). Thus, the upper body UB and the head He of the occupant Pa tilts in the vehicle left direction in which the turning acceleration acts.

From time t11, at which the steering is started, the occupant posture control unit 40 starts a process to cause the actuator 100 to gradually raise the right side of the seat cushion 61, which is the inward direction of the turn, as shown by the arrow Fup (S105, S106).

At time t12, during the turn, the occupant Pa and the seat surface 61a of the seat cushion 61 are tilted due to the raising of the right side, which is the inward direction of the turn. Since the inclination of the seat surface 61a, due to the raising thereof on the inward direction of the turn, matches the tilt direction of the occupant Pa, the seat surface 61a moves to maintain the state of contact with the occupant Pa.

Thereafter, when the host vehicle MVS approaches the curve exit Cout, the autonomous driving control unit 4 carries out a control to reverse the steering direction so as to return the steering angle toward the neutral position. Accordingly, the occupant posture control unit 40 first ends the raising of the side of the seat cushion 61 in the inward direction of the turn (S107, S108).

In addition, immediately before (time t13) the steering angle reaches the neutral position (S110, S111), the occupant posture control unit 40 rapidly lowers the side of the seat cushion 61 on the inward side of the turn, which cushion had been raised, to the original height. In response to the stimulus of the lowering of the right side of the seat surface 61a, the occupant Pa undergoes a change in posture in which the upper body UB is tilted toward the left of the vehicle, which is the outward direction of the turn, so that the right buttock does not drop reflexively.

That is, when the side of the seat surface 61a in the inward direction of the turn is rapidly lowered, the occupant Pa momentarily receives a stimulus in which the upper body UB and the head He suddenly drops toward the inward direction of the turn. As a result of this stimulus, muscle tension is produced in the occupant Pa that causes a change in posture in which the upper body UB and the head He are to reflexively tilted toward the inward direction of the turn in an attempt to return the head He, which has dropped toward the inward direction of the turn, toward the outward direction of the turn. The seat surface 61a is lowered approximately several millimeters to 1 to 2 centimeters, which is a small amount compared to the case in which the seat surface 61a is moved in order to keep the posture of the occupant Pa constant, and this lowering can be performed in a short period of time.

Then, the return of the steering angle to the neutral position (time t14) immediately after the lowering of the seat surface 61a produces swing-back acceleration that acts on the occupant Pa in the vehicle right direction. At this time, due to the immediately preceding reflexive muscle tension that is generated, the occupant Pa undergoes a change in posture that tilts the occupant in the vehicle left direction, which cancels out the swing-back acceleration, so that it is possible to suppress the upper body UB and the head He from being swung back in the vehicle right direction.

Accordingly, it is possible to suppress the occurrence of motion sickness caused by the swinging of the upper body UB and the head He of the occupant Pa to the left and right, due to the swing-back acceleration that occurs during travel through the curve Cu.

In particular, it is difficult for the occupant Pa other than the driver, or the driver when autonomous driving control is being carried out, to ascertain the timing at which the steering angle is returned to the neutral position at the curve exit Cout, so that it is difficult to assume a posture corresponding to the swing-back that occurs upon a return to the neutral position. For this reason, as described above, it is effective to provide a stimulus that produces muscle tension at an appropriate timing, in order to impart a posture corresponding to the swing-back, by means of the reflexive short-term change in posture.

In addition, since the seat surface 61a of the seat cushion 61 is raised in advance as a preparatory operation and then lowered to its original height, a process to return the seat to its original height after the lowering is not necessary. Here, if the seat surface 61a is lowered without a preparatory raising operation, it is necessary to raise the seat surface 61a to its original height after the lateral acceleration swing-back control is executed, at which point the occupant Pa may experience discomfort, but by means of the present embodiment, such discomfort would not occur. In addition, when the seat surface 61a is raised by means of the preparatory operation, the orientation of the seat surface 61a will be in the direction in which the lateral acceleration acts, so that the occupant Pa is not likely to experience discomfort at the time of the raising of the seat surface, and its state of contact with the occupant Pa can be maintained, so that the stimulus at the time of the next lowering can be reliably imparted to the occupant Pa.

A case in which negative acceleration swing-back posture control is executed during deceleration by means of braking of the host vehicle MVS will be described next with reference to FIG. 7. Again, braking at the time of autonomous driving by the autonomous driving control unit 4 will be described, but it can also be applied at the time of deceleration by means of the driver's braking operation.

FIG. 7 shows the changes in the vehicle orientation (vehicle motion) and the changes in the posture of the occupant Pa, when, from a state in which constant speed travel is being carried out (time t20), the vehicle is decelerated by means of a braking control at time t21, and then stopped or the deceleration is released at time t25. In FIG. 7, the driver is shown as the occupant Pa, but the occupant Pa is not limited to the driver.

In the constant speed travel state at time t20, the occupant posture control unit 40 predicts the stop location candidate in advance based on the road information, and monitors the brake switch 18 and the brake hydraulic pressure sensor 19 (Steps S121, S122, S123, S124). The host vehicle MVS starts a braking control at time t21, and from that point in time, negative acceleration acts on the occupant Pa in the vehicle front direction, so that the upper body UB of the occupant Pa leans forward, and the head He moves forward. A brake pedal BP and a shoe Sh stepping on the brake pedal are shown at time t21, but these are only to show the generation of a braking force, and such a braking operation by the driver would not accompany the execution of autonomous driving control.

During deceleration, when the deceleration exceeds a preset deceleration threshold (time t23), the occupant posture control unit 40 operates the actuator 100 to gradually raise (refer to the arrow Fup) the rear portion of the seat cushion 61 (seat surface 61a) (S125, S126).

Then, the negative acceleration swing-back estimation unit 423 infers that the deceleration would be released (time t24) and the host vehicle MVS would stop (time t25), and, immediately therebefore (time t23), the rear portion of the seat surface 61*a* is rapidly lowered to the original height, as shown by arrow Fdn (S128, S129).

By means of this lowering of the seat cushion 61 (seat surface 61*a*), the occupant Pa momentarily receives a stimulus in which the upper body UB and the head He suddenly drops in the vehicle rear direction. As a result of this stimulus, muscle tension occurs in the occupant Pa in an attempt to reflexively return the head He, which has dropped rearward to the original position, thereby imparting a change in posture to lean the head He and the upper body UB forward.

With the release of deceleration (time t24) or stopping (time t25) of the host vehicle MVS immediately thereafter, swing-back acceleration acts on the occupant Pa in the vehicle rear direction. At this time, the swing-back acceleration and the change in posture in the vehicle front direction that occurs due to the reflexive muscle tension described above cancel each other out, so that it is possible to suppress the head He and the upper body UB from being swung back and forth.

Accordingly, it is possible to suppress motion sickness caused by the head He and the upper body UB being swung back and forth, due to the swing-back in the front-rear direction during deceleration. In particular, it is difficult for the occupant Pa other than the driver, or the driver when autonomous driving control is being carried out, to ascertain the timing at which the deceleration is released or the vehicle is topped, so that it is difficult to assume a posture corresponding to swing-back during deceleration. For this reason, as described above, it is effective to provide a stimulus that produces muscle tension at an appropriate timing, in order to impart a posture corresponding to the swing-back, by means of the reflexive change in posture.

The effects of the occupant posture control method and the occupant posture control device according to the first embodiment will be listed below.

(1) The occupant posture control method according to the first embodiment is an occupant posture control method that controls the posture of the occupant Pa of the host vehicle MVS with the occupant posture control unit 40 based on information relating to vehicle motion. In addition, the actuator 100 is provided as an actuator that provides stimulus for generating muscle tension in the occupant Pa. The occupant posture control unit 40 predicts the vehicle motion by means of the processes of Steps S101 to S110 and S121 to S126, based on the information relating to vehicle motion. Then, when the predicted vehicle motion occurs, the occupant posture control unit 40 provides, by means of the actuator 100 via the seat 60, a stimulus that produces muscle tension such that an occupant Pa assumes a posture corresponding to the vehicle motion.

Accordingly, since a stimulus is applied to the occupant Pa to generate muscle tension so as to that a posture is assumed corresponding to the vehicle motion, it is possible to bring the occupant Pa to the desired posture in a short period of time. Thus, it is possible impart an appropriate posture to the occupant Pa at an appropriate timing with respect to the vehicle motion, and to suppress the occurrence of motion sickness.

(2) The occupant posture control method according to the first embodiment provides, by means of the actuator 100 via the seat 60, a stimulus that produces muscle tension such that the occupant Pa changes his or her posture in accordance with the predicted vehicle motion, to a part of the occupant Pa corresponding to the muscle tension. Accordingly, it is possible for the occupant to assume a posture corresponding to the vehicle motion in a short period of time by means of the change in posture due to the generation of muscle tension.

(3) By means of the occupant posture control method of the first embodiment, the change in posture is carried out by imparting a stimulus to cause the loss of posture of the occupant Pa by means of the actuator 100 via the seat 60, in order to generate muscular tension in an attempt to restore the posture that was lost/. Specifically, by imparting a sudden lowering stimulus to the left or to the right side of the lower body of the occupant Pa to cause a loss of posture on either the left or the right side, it is possible to impart a change in posture to cause the upper body UB and the head He to lean in the other direction, that is, to the right or the left side, so as to raise the one side that has undergone the loss of posture, in an attempt to return to the original posture. In addition, by rapidly lowering the rear portion of the lower body of the occupant Pa to provide a stimulus to cause a loss of posture of the rear portion, it is possible to impart a change in posture to cause the upper body UB and the head He to lean forward so as to raise the rear portion that has undergone the loss of posture, in an attempt to restore the original posture.

Accordingly, since a stimulus to cause a loss of posture of the occupant Pa is used as the stimulus, implementation is easy and it has excellent versatility. In addition, reflexive change in posture in a short period of time can be expected, so that it is possible to impart the appropriate posture at an appropriate timing.

(4) In the occupant posture control method according to the first embodiment, the predicted vehicle motion includes a motion to generate swing-back of the occupant Pa in the lateral direction of the vehicle as the vehicle turns.

Accordingly, it is possible to provide a stimulus to the occupant Pa to generate muscular tension and assume a posture corresponding to the swing-back in the lateral direction of the vehicle during turning, and thus to suppress the occurrence of motion sickness caused by this swing-back in the lateral direction of the vehicle.

(5) In the occupant posture control method according to the first embodiment, the predicted vehicle motion includes a motion to generate swing-back of the occupant Pa in the longitudinal direction of the vehicle as the vehicle decelerates.

Accordingly, it is possible to provide a stimulus to the occupant Pa to generate muscle tension and assume a posture corresponding to the swing-back in the longitudinal direction of the vehicle during deceleration traveling, and thus to suppress the occurrence of motion sickness caused by this swing-back in the longitudinal direction of the vehicle.

(6) The occupant posture control method according to the first embodiment is applied to an autonomous driving vehicle that generates a target travel route in advance and generates an operation schedule, and that travels along the target travel route based on this operation schedule.

Accordingly, it is possible to more accurately predict the vehicle motion based on the operation schedule and impart an appropriate posture to the occupant Pa with a more appropriate timing with respect to the vehicle motion, and to further suppress the occurrence of motion sickness.

(7) The occupant posture control device according to the first embodiment is equipped with the actuator 100 that provides stimulus that produces muscle tension in the occupant Pa of the host vehicle MVS, and the occupant posture control unit 40 that controls the actuator 100 based on information relating to the vehicle.

Then, the occupant posture control unit 40 includes the lateral acceleration swing-back estimation unit 415 and the negative acceleration swing-back estimation unit 423 as vehicle motion prediction units, and the inward-side-of-turn seat surface lowering control unit 417 and the seat surface rear portion lowering control unit 425 that control the actuator 100 that provides a stimulus for generating muscle tension in the occupant Pa. The lateral acceleration swing-back estimation unit 415 and the negative acceleration swing-back estimation unit 423 predict the lateral acceleration swing-back and the negative acceleration swing-back as vehicle motions based on the information relating to vehicle motion. When lateral acceleration swing-back or negative acceleration swing-back occurs, the inward-side-of-turn seat surface lowering control unit 417 or the seat surface rear portion lowering control unit 425 operates the actuator 100 and provides a stimulus to the occupant Pa with the seat 60 to generate muscle tension that induces a posture corresponding to the respective acceleration swing-back.

Accordingly, in a short period of time, it is possible to bring the occupant Pa to a posture corresponding to the lateral acceleration swing-back or the negative acceleration swing-back as the vehicle motion. Thus, it is possible impart an appropriate posture to the occupant Pa at an appropriate timing with respect to the vehicle motion, and to suppress the occurrence of motion sickness.

Other Embodiments

Other embodiments will be described below. In the descriptions of the other embodiments, common configurations have been assigned the same reference symbols and only the differences therefrom will be described.

The occupant posture control method and the occupant posture control device according to the second embodiment will be described.
This second embodiment is an example in which muscle tension that imparts posture maintenance to the occupant Pa is generated by means of generation of muscle tension.

In the second embodiment, the muscle-stimulating actuator 200 shown in FIG. 8 is provided on the seat 60 as an actuator that provides stimulus for generating muscle tension in the occupant Pa. This muscle-stimulating actuator 200 provides a stimulus for generating muscle tension that imparts posture maintenance independently to each of the left and right legs LE of the occupant Pa, an example being an actuator that applies an electrical stimulus to the legs LE.

Figure 9:
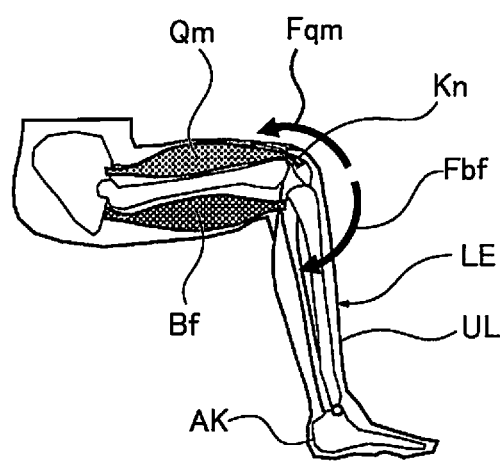
FIG. 9 is an explanatory diagram of applying a muscle stimulus in the second embodiment.

In addition, muscle tension that imparts posture maintenance to the legs LE can be realized by providing a stimulus for contraction of both opposing muscles of the legs LE. For example, as shown in FIG. 9, by simultaneously applying an electrical stimulus to the quadriceps femoris Qm and the biceps femoris Bf, which are opposing muscles of the leg LE, to stimulate contraction, it is possible to maintain the posture of the leg LE in a so-called stiffened state. That is, a force that rotates the lower limb UL in the direction of the arrow Fqm about the knee Kn is generated by means of the contraction of the quadriceps femoris Qm and a force that rotates the lower limb UL in the direction of the arrow Fbf about the knee Kn is generated by means of the contraction of the biceps femoris Bf, and the posture of the leg LE is maintained with the balance of the two forces. The stimulus for causing such contraction of the muscles is not limited to an electrical stimulus, and, for example, it is possible impart a stimulus to simultaneously apply pressure to opposing muscles of the leg LE with an air bag, or the like.

An occupant posture control unit 240 that controls the operation of the muscle-stimulating actuator 200 shown in FIG. 8 will be described next. This occupant posture control unit 240 is an example in which lateral acceleration swing-back posture control is executed when the host vehicle MVS changes lanes, and a start-of-deceleration posture control is executed, which suppresses a change in posture when lateral acceleration is generated in the host vehicle MVS at the start of negative acceleration.

Figure 10:
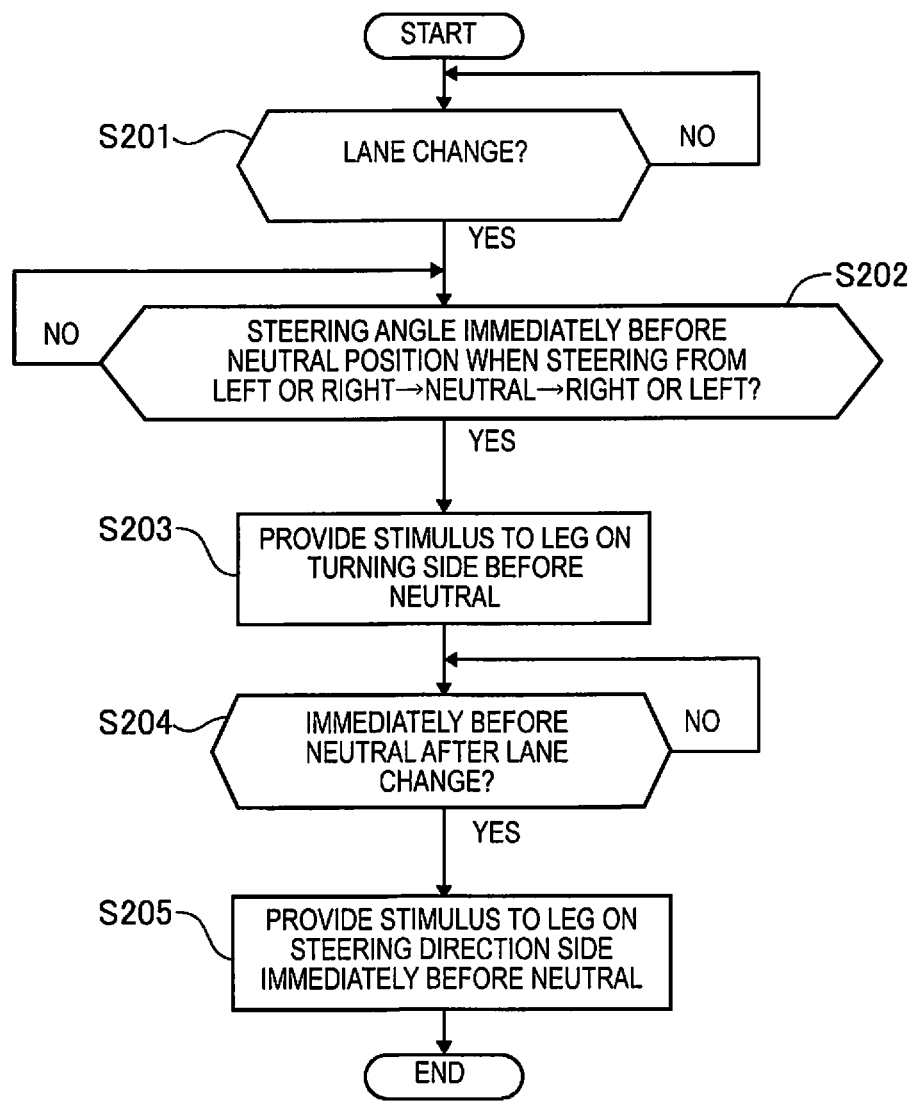
FIG. 10 is a flowchart illustrating a flow of the lateral acceleration swing-back process during lane changes in the second embodiment.

FIG. 10 is a flowchart illustrating the process flow of the lateral acceleration swing-back posture control when changing lanes, and the process is started by turning the ignition switch on. In the first Step S201, a determination is made whether an operation schedule to carry out lane change has been set in the autonomous driving control unit 4.

In the next Step S202, when the vehicle is steered to the left or to the right during a lane change, a determination is made whether the steering angle is immediately before the neutral position when the vehicle is being steered in the opposite direction; if the steering angle is immediately before the neutral position, the process goes to Step S203, otherwise Step S202 is repeated. Then, in Step S203, to which the process proceeds immediately before the neutral position is achieved, the muscle-stimulating actuator 200 is operated so as to provide a muscle stimulus to the leg LE on the steering direction side before the neutral position is reached, and the process goes to the next Step S204.

In Step S204, a determination is made whether it is immediately before the steering angle is returned to the neutral position after changing lanes; if it is immediately before the neutral position, the process proceeds to Step S205, otherwise Step S204 is repeated.

Then, in Step S205, to which the process proceeds immediately before the neutral position, the muscle-stimulating actuator 200 is operated so as to impart a muscle stimulus to the leg LE on the side of the direction of the steering before reaching the neutral position, and the process is ended.

Changes in the vehicle orientation and changes in the posture of the occupant Pa during a lane change will be described next based on FIG. 8. FIG. 8 illustrates the vehicle motion state and changes in the posture of the occupant Pa when changing lanes from a first lane LA1 to a second lane LA2 adjacent to the left during travel on a road Ro.

First, the steering state and the vehicle motion when changing lanes will be described. In this lane change example, at time t30, the host vehicle MVS is maintaining the steering angle at the neutral position and is traveling in a straight line in the first lane LA1. Then, steering is started to the left at time t31, and at time t32, when the host vehicle MVS starts to straddle the two lanes LA1, LA2, the steering is started to return to the right, which is the opposite direction. Time t33 indicates the time immediately before the neutral position when the steering direction is switched from the left direction to the right direction.

Then, the steering state in the right direction is maintained until time t34 (t34), and when the travel lane has been changed to the second lane LA2, in order to travel in a straight line, from time t35, it is steered to the left in order to return the steering angle to the neutral position, and the steering angle is returned to the neutral position at time t36.

The lateral acceleration that acts on the occupant Pa accompanying the vehicle motion when changing lanes in this manner will be described next.

From time t32, when the host vehicle MVS starts to turn left, turning acceleration acts on the occupant Pa in the right direction, which is the outer diameter direction of the turn, and the upper body UB and the head He of the occupant Pa lean to the right. Thereafter, at time t33 immediately before the neutral position when the steering direction is switched from the left to the right, swing-back acceleration acts on the occupant Pa in the left direction, so that the upper body UB and the head He of the occupant Pa are swung to the left.

Then, after the host vehicle MVS has changed the travel lane to the second lane LA2, at time t35 when it is steered to the right in order to return the steering position to the neutral position, lateral acceleration acts on the occupant Pa in the right direction, which is the turning direction. Thereafter, when the steering is returned to the neutral position, swing-back acceleration acts on the occupant Pa in the direction opposite to that of the turning acceleration that had been acting up until that point.

The lateral acceleration posture control of the second embodiment when changing lanes will be described next.

The occupant posture control unit 240 operates the muscle-stimulating actuator 200 so as to impart muscle stimulus to the left leg LE(L) of the occupant Pa at time t33 immediately before the neutral position when the steering direction is switched from the left to the right (Steps S302, S303).

By using this stimulus, muscle tension occurs in the occupant Pa in the quadriceps femoris Qm and the biceps femoris Bf, which are opposing muscles of the left leg LE(L), and the leg LE(L) is brought into a stiffened state, thereby being imparted with posture maintenance state. Accordingly, when, the occupant Pa is in a state of receiving turning acceleration in the right direction and receives swing-back lateral acceleration in the opposite, that is, the left direction, it is possible to brace himself or herself by means of the posture maintenance of the leg LE(L) that is in the stiffened state, thereby suppressing movement of the head He and the upper body UB caused by the swing-back.

In addition, immediately before t36 when the steering position is returned to the neutral position from a state of turning to the right after changing lanes to the second lane LA2, the occupant posture control unit 240 operates the muscle-stimulating actuator 200 so as to impart muscle stimulus to the right leg LE(R) (Steps S304, S305). Accordingly, when the occupant Pa receives swing-back lateral acceleration when returning to the neutral position from a right-turning state, it is possible to brace himself or herself by means of the posture maintenance of the right leg LE(R) that is in the stiffened state, thereby suppressing movement of the head He and the upper body UB caused by the swing-back.

As described above, it is possible to suppress motion sickness caused the left-right swinging of the upper body UB and the head He of the occupant Pa, due to the swing-back acceleration that occurs when the steering position is returned to the neutral position when changing lanes.

In addition, even in the second embodiment, it is possible to execute the lateral acceleration swing-back control which suppresses the upper body UB and the head He of the occupant Pa from being swung to the left and right, due to the swing-back of the lateral acceleration when turning.

In this case, a stimulus is imparted to the leg LE of the occupant Pa on the side of the inward direction of the turn with the muscle-stimulating actuator 200, at the timing to execute the process of Step S111 described in the first embodiment. Muscle tension thereby occurs in the leg LE to which the stimulus has been applied, and the leg is brought into the so-called stiffened state, thereby being able to maintain the posture.

Thus, when swing-back acceleration acts on the occupant Pa in the lateral direction, the leg LE that is stiffened and maintains the posture can brace himself or herself and suppress the upper body UB and the head He of the occupant Pa from being swung in the inward direction of the turn. As a result, it is possible to suppress the occurrence of motion sickness caused by the upper body UB and the head He being swung to the left and right due to the lateral swing-back acceleration that occurs during travel on a curve Cu (refer to FIG. 6).

The start-of-deceleration posture control according to the second embodiment will be described next.

This start-of-deceleration posture control is a control for suppressing the upper body UB and the head He of the occupant Pa from being moved in the vehicle front direction when braking is carried out and negative acceleration is generated in the host vehicle MVS.

Figure 11:
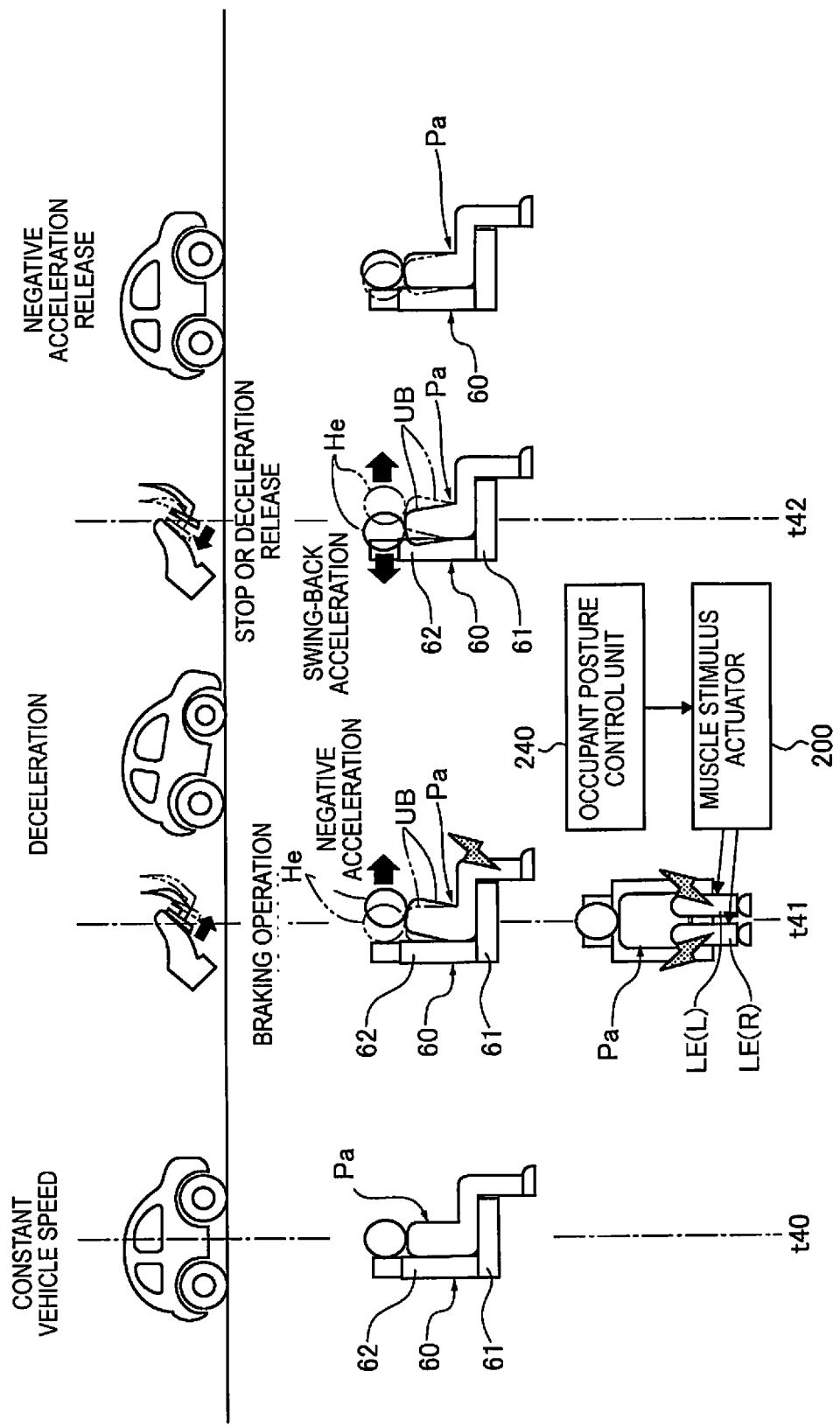
FIG. 11 is a time chart illustrating the vehicle motion of the host vehicle MVS, a braking state, the change in posture of the occupant Pa, and the stimulus applied state when a start-of-deceleration posture control is executed by means of the second embodiment during decelerated travel.

In this start-of-deceleration posture control, stimulus that produces muscle tension in the left and right legs LE(L), LE(R) is provided by the muscle-stimulating actuator 200 at time t41 shown in FIG. 11, which is when the braking operation is started, or immediately therebefore. As a result, the posture of the occupant Pa is maintained wherein the left and right legs LE(L), LE(R) are stiffened, and the occupant assumes a posture for receiving the negative acceleration state in the vehicle front direction, so that it is possible to suppress the movement of the upper body UB and the head He in the vehicle front direction due to the negative acceleration.

With respect to the control of the muscle-stimulating actuator 200, although a flowchart is omitted, as long as it is possible to execute autonomous driving control, it is possible to accurately determine the timing immediately before the start of braking based on the operation schedule thereof, and to execute the above-described start-of-deceleration posture control. In addition, even when the driver is driving, it is possible to detect the timing immediately before braking force is actually generated by detecting the amount of depression of the brake pedal BP. Further, even in the case of detecting the time at which braking is started to execute this start-of-deceleration posture control, it is possible to generate muscle tension at the point in time at which little or no negative acceleration has been generated, so that the above-described effect can be obtained.

In addition, the start-of-deceleration posture control is effective when the occupant Pa is not the driver, or, during autonomous driving control, when the occupant is the driver. That is, when the driver himself or herself carries out a braking operation, the driver can attempt to maintain his or her posture such that the upper body UB and the head He do not move to a certain degree while a braking operation is carried out. In contrast, it is difficult for an occupant Pa that is not the driver, or, during autonomous driving control, the driver, to predict the timing at which the braking operation is started, so that it is difficult for them to brace themselves by assuming a posture adapted to the braking. Accordingly, executing the at-the-time-of-braking control described above and suppressing a change in posture of the occupant Pa at the time at which braking is started is effective in preventing motion sickness.

Further, by suppressing the movement of the upper body UB and the head He of the occupant Pa in the vehicle front direction at the start of braking, it is possible thereafter to suppress the amount of movement of the upper body UB and the head He in the vehicle rear direction, due to the swing-back acceleration in the vehicle rear direction when the vehicle is stopped or the deceleration is released (time t42).

This also makes it possible to suppress the occurrence of motion sickness caused by the back-and-forth swinging of the upper body UB and the head He of the occupant Pa during braking.

The effects of the occupant posture control method according to the second embodiment will be listed below.

(2-1) In the occupant posture control method according to the second embodiment, stimulus is provided at a location that would impart posture maintenance to the occupant Pa by generating muscle tension.

Accordingly, it is possible to stimulate the occupant Pa to generate muscle tension so as to assume a posture corresponding to the vehicle motion by means of a force to maintain the posture of the occupant Pa, in order to suppress a change in posture of the occupant Pa and to suppress the occurrence of motion sickness.

(2-2) In the occupant posture control method according to the second embodiment, posture maintenance is imparted by providing a stimulus to contract the quadriceps femoris Qm and the biceps femoris Bf of the occupant Pa, which are mutually opposing muscles, with the muscle-stimulating actuator 200 serving as the actuator that provides a stimulus for generating muscle tension in the occupant Pa.

Therefore, it is possible to tension the opposing muscles in order to firmly stiffen the muscles and to reliably carry out posture maintenance. In addition, in the present second embodiment, since muscle tension is generated by means of electrical stimulus, muscle reflex can be easily generated, and it is possible to impart an appropriate posture at an appropriate timing. Moreover, in the same manner as in the first embodiment, the effects described in (1) and (4) to (7) above are also exhibited.

The occupant posture control method and the occupant posture control device according to the third embodiment will be described next.

The third embodiment is a modified example of the first embodiment, and is an example in which the foot sole-moving actuator 300 that moves the sole of the foot of the occupant Pa is used as the actuator that provides a stimulus for generating muscle tension in the occupant Pa, to impart a change in posture corresponding to vehicle motion.

Figure 13A:
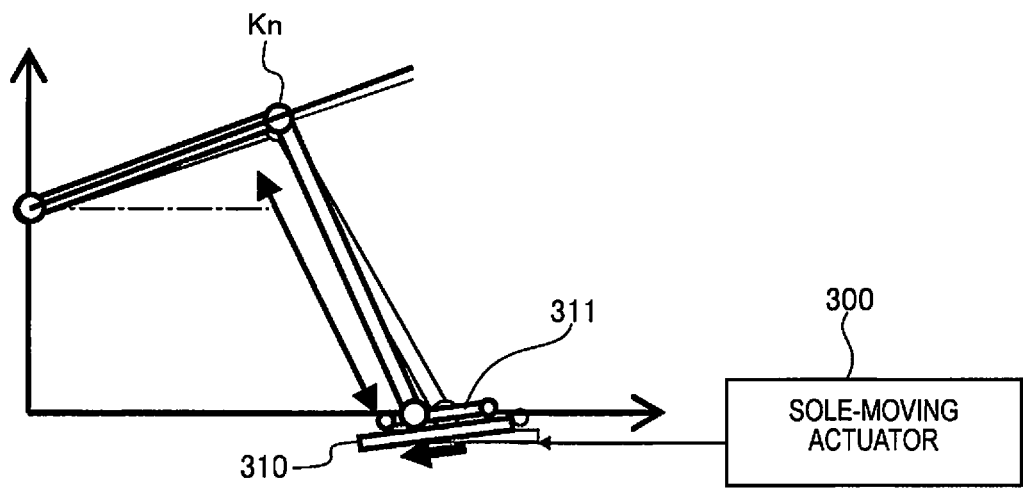
FIG. 13A is an explanatory diagram of stimulus application in the third embodiment.

As shown in FIG. 12A, the foot sole-moving actuator 300 includes the moving plate 310 that has a tread surface 311 on its upper surface on which the sole of the occupant Pa is placed. The moving plate 310 is supported with respect to the floor surface of the vehicle body so as to be movable in the longitudinal direction of the vehicle, and, as shown in FIG. 13A, is supported so as to be able to form, from an essentially horizontal state, a rearward-inclined state, in which the rear end portion becomes lower than front end portion. Then, the sole-moving actuator 300 can use a motor or fluid pressure as a drive source to move the moving plate 310 in the longitudinal direction of the vehicle, or to shift it between the essentially horizontal state and the rearward-inclined state.

The foot sole-moving actuator 300 and changes in the posture of the occupant Pa will be described next.

Figure 12B:
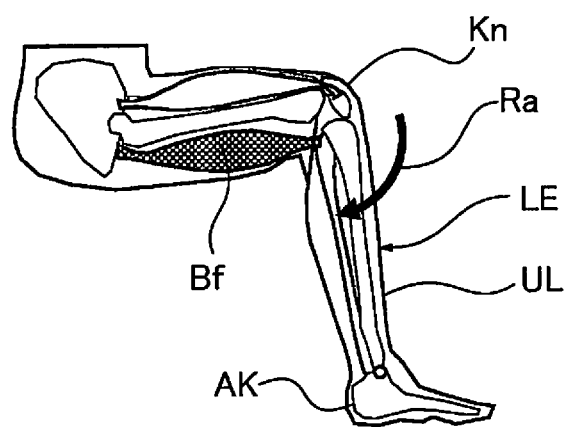
FIG. 12B is an explanatory diagram of muscle tension caused by the stimulus application in the third embodiment.

As shown in FIG. 12A, when the moving plate 310 is slid toward the rear of the vehicle (in the direction of arrow RR), the position of the knee Kn of the leg LE of the occupant Pa rises as indicated by the arrow UP, and a muscle stimulus that extends the biceps femoris Bf shown in FIG. 12B is applied. Then, as a reflex to this muscle stimulus, muscle tension to contract the biceps femoris Bf occurs, and a change in posture to move the lower limb UL in the direction of the arrow Ra about the knee Kn is generated, which increases the rotational stiffness of the knee Kn.

Thus, when this muscle tension is generated in either the left or the right leg LE, the stiffness of the leg LE increases and it is possible to impart a change in posture that counters the lateral acceleration. In addition, when the muscle tension is generated in the left and right legs LE, the stiffness in both legs LE increases and it is possible to impart a change in posture that counters the acceleration in the longitudinal direction of the vehicle.

Figure 13B:
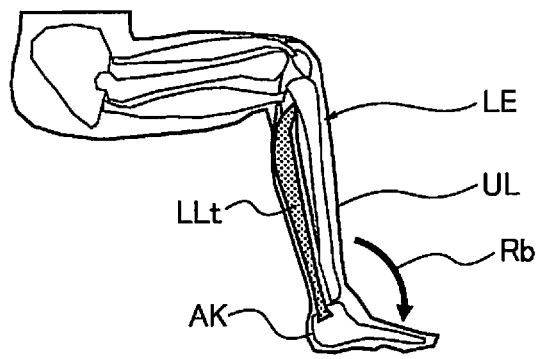
FIG. 13B is an explanatory diagram of the muscle tension caused by the stimulus application in the third embodiment.

In addition, as shown in FIG. 13A, when the moving plate 310 is moved from a horizontal state to a rearward-inclined state, a muscle stimulus that extends the triceps surae LLt shown in FIG. 13B is applied. Then, as a reflex to this muscle stimulus, the triceps surae LLt contracts and a change in posture is imparted to the ankle AK in the direction of rotation indicated by the arrow Rb in FIG. 13B.

Figure 14:
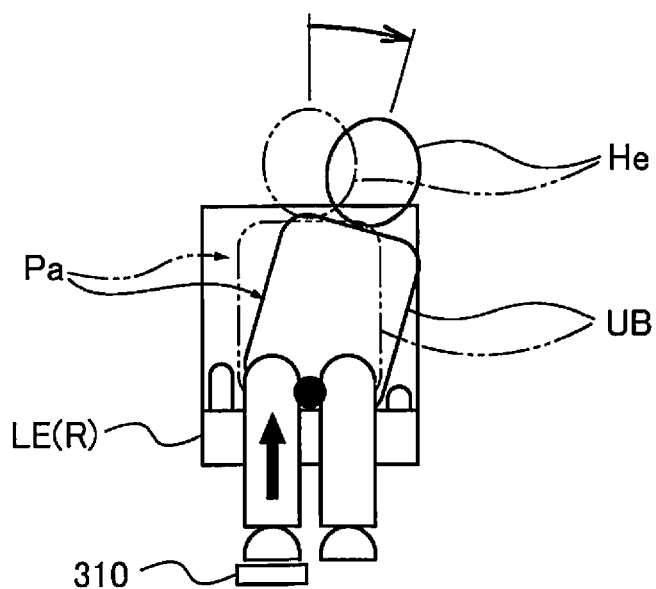
FIG. 14 is an explanatory diagram of a change in posture caused by the stimulus application in the third embodiment.

Accordingly, when the muscle stimulus shown in FIG. 13A is provided to both legs LE, a change in posture to move the upper body UB and the head He of the occupant Pa rearward takes place. In addition, if the stimulus is applied to either the left or the right leg LE, a change in posture occurs in which the upper body UB and the head He are made to lean in the direction opposite the side that received the stimulus. FIG. 14 illustrates a case in which a stimulus is applied to bring the moving plate 310 below the right leg LE(R) into the rearward-inclined state, and, in this case, a change in posture occurs in which the upper body UB and the head He of the occupant Pa are made to lean toward the left.

Thus, it is possible to impart muscle stimulus to both legs LE at the timing of executing the start-of-deceleration posture control described in the second embodiment in order to suppress the movement of the upper body UB and the head He of the occupant Pa caused by negative acceleration. In addition, it is possible to impart muscle stimulus to either the left or the right leg LE at the timing of the lateral acceleration swing-back control described in the first embodiment in order to suppress the lateral movement of the upper body UB and the head He of the occupant Pa caused by lateral swing-back. Accordingly, even in the third embodiment, it is possible to exhibit the same effects as those of the first embodiment.

The occupant posture control method and the occupant posture control device according to the fourth embodiment will be described next.

This fourth embodiment is a modified example of the third embodiment, and another example of an actuator that provides a stimulus in the direction of extending the biceps femoris Bf will be presented, as illustrated in FIGS. 12A and 12B.

The actuator 400 illustrated in the fourth embodiment comprises the arm 401 and the arm actuator 402 shown in FIGS. 15A and 15B. The arm 401 is supported by the seat cushion 61 so as to be movable along an arc Rk centered at the knee Kn of the leg LE of the occupant Pa seated in the seat 60. The arm actuator 402 includes a drive source, such as a motor, that applies driving force to the arm 401 in a rotational direction along the arc Rk, and a power transmission mechanism such as a gear.

An occupant posture control unit 440 normally operates the arm actuator 402 so as to dispose the arm 401 rearward, away from the lower limb UL, as shown in FIG. 15A.

Figure 15C:
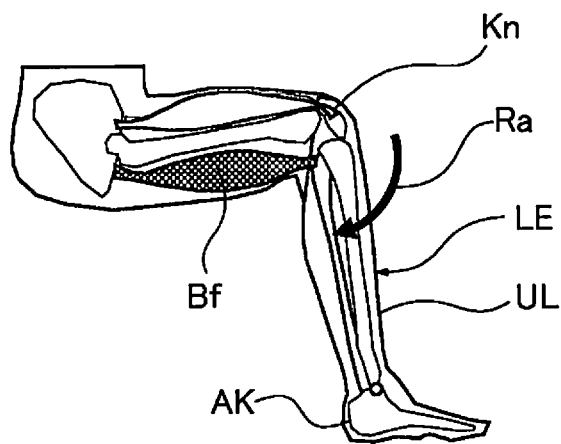
FIG. 15C is an explanatory diagram of the muscle tension caused by the stimulus application in the fourth embodiment.

Then, when it is desired to produce a change in posture to extend the biceps femoris Bf, the arm 401 is moved forward to move the lower limb UL forward. As a result, stimulus is applied to the leg LE to extend the biceps femoris Bf, and muscle tension reflexively occurs in the direction to contract the biceps femoris Bf, so that it is possible to impart a change in posture to rotate the lower limb UL along the arrow Ra about the knee Kn, as shown in FIG. 15C. Thus, even in the fourth embodiment, it is possible to exhibit the same effects as those in the first embodiment.

The occupant posture control method and the occupant posture control device according to the fifth embodiment will be described next.

This fifth embodiment is a modified example of the third embodiment, and a modified example of the actuator that provides a stimulus in the direction of extending the triceps surae LLt will be presented, as illustrated in FIGS. 13A and 13B.

The actuator 500 illustrated in the fifth embodiment comprises the arm 510 and the arm actuator 520 provided on the seat cushion 61, as shown in FIGS. 16A and 16B.

The arm 510 includes the arm body 511, the upper operating portion 512, and the lower operating portion 513. The arm body 511 is supported by the seat cushion 61 so as to be movable in an arc shape in the front-rear direction. The upper operating portion 512 and the lower operating portion 513 are provided at the front end of the arm body 511 and are supported so as to be rotatable with a prescribed degree of accuracy, in a vertically symmetrical manner with respect to the arm body 511.

The arm actuator 520 is, for example, an electric motor, and the rotational driving force is provided to the arm body 511, the upper operating portion 512, and the lower operating portion 513 via a power transmission mechanism such as a gear or a belt.

An occupant posture control unit 540 normally operates the arm actuator 502 such that the arm body 511 is disposed so that the two operating portions 512 and 513 are separated rearward, away from the lower limb UL.

Then, when a muscle stimulus is applied to extend the triceps surae LLt of the occupant Pa, first, the arm body 511 is moved forward and the upper operating portion 512 and the lower operating portion 513 are made to come into contact with the lower limb UL at the position of the triceps surae LLt. The upper operating portion 512 and the lower operating portion 513 are then turned relative to the arm body 511 so as to separate from each other in the vertical direction.

The occupant Pa thereby receives a stimulus that stretches the triceps surae LLt, and by means of the reflexive muscle tension, a change in posture is imparted to rotate in the direction of the arrow Rb about the ankle AK, in the same manner as described in FIG. 13B of the third embodiment. Thus, even in the fifth embodiment, it is possible to exhibit the same effects as those of the first embodiment.

The occupant posture control method and the occupant posture control device according to the present disclosure have been described above based on the embodiments. However, specific configurations are not limited to these embodiments, and various modifications and additions to the design can be made without departing from the scope of the invention according to each claim in the Claims.

For example, in the embodiments, an example was presented in which the occupant posture control method and the occupant posture control device are applied to a vehicle that executes autonomous driving control, but no limitation is imposed thereby. For example, it may be applied to any vehicle to which information for predicting vehicle motion is input, such as a vehicle that carries out driving assistance control. In addition, the prediction of vehicle motion need only be able to detect the state immediately before vehicle motion actually occurs, and includes, for example, the case in which the state immediately before vehicle motion actually occurs based on detection of a turning operation or a braking operation executed by the driver.

In addition, in the first embodiment, an example was presented in which the seat surface 61a is raised in advance as a preparatory operation before the lowering of the seat surface 61a to impart muscle tension, but the seat surface 61a may be lowered without this preparatory operation. In that case, the seat surface 61a is gradually returned to its original height after a change in posture is produced by means of the lowering.

In addition, in the embodiments, examples were presented in which the actuator for imparting stimulus that imparts a change in posture raises and lowers the seat surface 61a of the seat cushion 61, or provides stimulus to extend muscles, but no limitation is imposed thereby. For example, the actuator that provides a stimulus for generating muscle tension in the occupant Pa may be an actuator that provides a stimulus that pokes the upper body UB of the occupant Pa on the side of the body (for example, the flank or the back) in the same direction as the direction of movement (direction in which acceleration acts).

Further, warm/cold sensation stimulus may be used as the stimulus that can impart a change in posture by means of the actuator that provides a stimulus for generating muscle tension in the occupant Pa. For example, a cold object, including a fluid, or a hot object, including a fluid, may be brought into contact with the occupant Pa in order to impart a change in posture by means of muscle tension caused by the reflexive action to move away from these objects.

In addition, in the embodiments, an example was presented in which electrical stimulus that contracts both opposing muscles is applied as the stimulus that imparts postural maintenance, but no limitation is imposed thereby. For example, both opposing muscles may be made to contract by the application of pressure. Alternatively, in addition to the warm and cold sensation stimuli, optical stimuli, and auditory stimuli, gustatory stimuli can be used. For example, it is known that the neck muscles will contract in response to a sour taste stimulus.

Moreover, the actuator that provides a stimulus for generating muscle tension in the occupant Pa may be an actuator that provides a stimulus by generating sound or light with an actuator, without direct contact with the occupant Pa. For example, as an example of an auditory stimulus, an actuator that provides a stimulus by generating a change in the position of a sound field, a change in sound pressure, or a rhythm may be used. In this case, if a loud sound is suddenly emitted from a certain direction, it is possible to produce a change in posture by means of reflexive muscular tension that moves the body (upper body UB) in a direction away from the sound. In addition, as an example of the use of light, an actuator that provides a visual stimulus to the area of peripheral vision or an eye-catching stimulus may be used. Specifically, by providing a light stimulus to the area of peripheral vision, it is possible to impart a change in posture by generating reflexive muscular tension that produces a movement in a direction away from the light. In addition, by providing a stimulus to the area of peripheral vision, it is possible to secure the central vision. Alternatively, when executing autonomous driving control in which the driver is not required to attentively look ahead, for example, by imparting a stimulus using a video in which an object is heading toward the occupant Pa, including the driver, it is possible to impart a change in posture by means of reflexive muscular tension to move away from (escape) the object.

Further, in the embodiments, as example was presented in which information from the on-board sensor 1, the map data storage unit 2, and the external data communication unit 3 is used as the information relating to the vehicle motion, but no limitation is imposed thereby. For example, information obtained by detecting the movement of the driver may also be used. That is, when the driver himself or herself drives the vehicle, it is known that, when a vehicle motion corresponding to a driving operation occurs, the driver assumes a posture corresponding to the driving operation. Therefore, the driver's posture and postural changes, particularly movements of the head, may be captured with a camera, or the like, and converted into data, and the vehicle motion may be predicted from the driver's posture including movements of the head, and changes thereof, in order to control the posture of the other occupants Pa in accordance therewith.

In addition, the posture control of the occupant Pa may be carried out when acceleration in a specific frequency region (for example, in the vicinity of 0.2 Hz) occurs. That is, the 0.2 Hz region is associated with a decline in the functions of motor sensory organs (vestibular organs (semicircular canal and otolith)), and it is thought that it is this region where motion sickness tends to occur. Therefore, a posture control for providing a stimulus to generate muscular tension may be executed when acceleration occurs in such a frequency band that tends to cause motion sickness.

The invention claimed is:

1. An occupant posture control method comprising:
   using a controller to
   acquire information related to a vehicle motion of a vehicle;
   predict a change in the vehicle motion of the vehicle based on the information related to the vehicle motion of the vehicle; and
   control an actuator to impart a stimulus to an occupant of the vehicle before the change in the vehicle motion occurs such that a muscle tension is generated in the occupant,
   the actuator being controlled to impart the stimulus to a part of the occupant corresponding to where the muscle tension is to be generated, the muscle tension being generated by causing the occupant to undergo a posture loss from a first posture to a second posture, thereby generating the muscle tension as a reflexive muscle tension opposing the vehicle motion due to the occupant attempting to return from the second posture to the first posture.

2. The occupant posture control method according to claim 1, wherein
   the change in the vehicle motion generates a swing-back of the occupant in a lateral direction of the vehicle as the vehicle turns.

3. The occupant posture control method according to claim 1, wherein
   the change in the vehicle motion generates a swing-back of the occupant in a longitudinal direction of the vehicle as the vehicle decelerates.

4. The occupant posture control method according to claim 1, wherein
   the stimulus includes a first movement of the actuator and a second movement of the actuator after the first movement, the actuator moving more rapidly during the second movement than during the first movement.

5. The occupant posture control method according to claim 4, wherein
   the actuator is controlled to move in a first direction during the first movement and in a second direction during the second movement.

6. The occupant posture control method according to claim 5, wherein
   the first movement causes a seat of the vehicle to rise, and the second movement causes the seat to be lowered.

7. The occupant posture control method according to claim 4, wherein
   the second movement causes the occupant to undergo the posture loss.

8. The occupant posture control method according to claim 1, wherein
   the stimulus includes moving the sole of a foot of the occupant.

9. An occupant posture control method comprising:
   using a controller to
   acquire information related to a vehicle motion of a vehicle;
   predict a change in the vehicle motion of the vehicle based on the information related to the vehicle motion of the vehicle; and
   control an actuator to impart a stimulus to an occupant of the vehicle before the change in the vehicle motion occurs such that a muscle tension is generated in the occupant,
   the actuator is controlled to impart impart the stimulus to a part of the occupant corresponding to where the muscle tension is to be generated, thereby causing opposing muscles at the part of the occupant occupant contract such that a posture of the occupant is maintained.

10. The occupant posture control method according to claim 9, wherein
    the stimulus includes applying an electrical stimulus to a leg of the occupant.

11. The occupant posture control method according to claim 9, wherein
    the stimulus includes applying a pressure to a leg of the occupant.

12. An occupant posture control device comprising:
    an actuator configured to impart a stimulus that produces a muscle tension in an occupant; and
    a controller configured to control the actuator based on information relating to a vehicle motion,
    the controller being configured to predict a change in the vehicle motion based on the information relating to the vehicle motion, and control the actuator to produce the muscle tension before the change in the vehicle motion occurs,
    the controller controlling the actuator to impart the stimulus to a part of the occupant corresponding to where the muscle tension is to be generated, the muscle tension being generated by causing the occupant to undergo a posture loss from a first posture to a second posture, thereby generating the muscle tension as a reflexive muscle tension opposing the vehicle motion due to the occupant attempting to return from the second posture to the first posture.

13. The occupant posture control device according to claim 12, wherein, the actuator is configured raise and lower a seat of the vehicle.

14. The occupant posture control device according to claim 12, wherein the actuator is configured to move the sole of a foot of the occupant.

* * * * *